(12) United States Patent
Mao et al.

(10) Patent No.: US 9,112,905 B2
(45) Date of Patent: Aug. 18, 2015

(54) AUTHENTICATION OF ACCESS TERMINAL IDENTITIES IN ROAMING NETWORKS

(75) Inventors: Yinian Mao, San Diego, CA (US); Qing Li, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/243,185

(22) Filed: Sep. 23, 2011

(65) Prior Publication Data
US 2012/0100832 A1  Apr. 26, 2012

Related U.S. Application Data

(60) Provisional application No. 61/406,017, filed on Oct. 22, 2010, provisional application No. 61/435,267, filed on Jan. 22, 2011.

(51) Int. Cl.
*H04W 12/06* (2009.01)
*H04W 60/00* (2009.01)
(Continued)

(52) U.S. Cl.
CPC ............. *H04L 63/162* (2013.01); *H04W 12/06* (2013.01); *H04L 63/083* (2013.01); *H04L 63/0823* (2013.01); *H04W 8/12* (2013.01)

(58) Field of Classification Search
CPC .............................. H04W 12/06; H04W 60/00
USPC ........... 455/410, 436; 370/331; 713/169, 186, 713/182
See application file for complete search history.

(56) References Cited

U.S. PATENT DOCUMENTS 6,408,175 B1   6/2002   Park
6,804,506 B1 * 10/2004   Freitag et al. ................. 455/411
(Continued)

FOREIGN PATENT DOCUMENTS

CN    1183202 A    5/1998
CN    1225226 A    8/1999
(Continued)

OTHER PUBLICATIONS

3GPP: "3rd Generation Partnership Project; Technical Specification Group Service and Systems Aspects: Security of H(e)NB; (Release 8)", 3GPP TR 33.820 V8.3.0, vol. 33.820, No. V8.3.0 Dec. 1, 2009, pp. 1-99, XP002650893, Retrieved from the Internet: URL:http://www.quintillion.co.jp/3GPP/Specs/33820-830.pdf Sections 6 and 7.
(Continued)

*Primary Examiner* — Jinsong Hu
*Assistant Examiner* — Jean Chang
(74) *Attorney, Agent, or Firm* — Won Tae C. Kim

(57) ABSTRACT

Various methods of authenticating an access terminal are presented in the case where the access terminal is roaming within a visited network. An access terminal sends a device authentication message to a visited validation server or a home validation server, where the device authentication message includes an access terminal identifier and authentication data generated at least in part using the validation key. In some embodiments, the authentication data may include a digital signature by a validation key associated with the access terminal identifier. Such a signature can be authenticated by either the visited validation server or the home validation server. In other embodiments, the authentication data may include an access terminal authentication token sent to the visited validation server. The visited validation server can authenticate the device authentication message by comparing the access terminal authentication token with an access terminal authentication token obtained from the home validation server.

61 Claims, 11 Drawing Sheets

(51) Int. Cl.
*H04L 29/06* (2006.01)
*H04W 8/12* (2009.01)

(56) References Cited

U.S. PATENT DOCUMENTS

| | | | |
|---|---|---|---|
| 6,826,690 B1* | 11/2004 | Hind et al. | 713/186 |
| 7,203,836 B1 | 4/2007 | Maringer et al. | |
| 7,325,133 B2 | 1/2008 | Fascenda | |
| 7,769,175 B2 | 8/2010 | Bajar et al. | |
| 7,779,267 B2 | 8/2010 | Chen et al. | |
| 7,966,000 B2 | 6/2011 | Semple et al. | |
| 8,566,926 B1* | 10/2013 | Schnellbacher et al. | 726/21 |
| 8,645,699 B2* | 2/2014 | Wood et al. | 713/176 |
| 2002/0073229 A1 | 6/2002 | Hayashi | |
| 2002/0091933 A1* | 7/2002 | Quick et al. | 713/182 |
| 2004/0111616 A1 | 6/2004 | Adi | |
| 2004/0180657 A1 | 9/2004 | Yaqub et al. | |
| 2006/0089123 A1* | 4/2006 | Frank | 455/411 |
| 2006/0120531 A1 | 6/2006 | Semple et al. | |
| 2006/0206710 A1* | 9/2006 | Gehrmann | 713/168 |
| 2006/0236369 A1 | 10/2006 | Covington et al. | |
| 2006/0291422 A1* | 12/2006 | Rochford | 370/331 |
| 2007/0010242 A1* | 1/2007 | Blants et al. | 455/424 |
| 2007/0016780 A1 | 1/2007 | Lee et al. | |
| 2007/0142086 A1 | 6/2007 | Boursier et al. | |
| 2008/0295159 A1 | 11/2008 | Sentinelli | |
| 2008/0301776 A1* | 12/2008 | Weatherford | 726/3 |
| 2009/0075584 A1* | 3/2009 | Jung et al. | 455/3.01 |
| 2009/0172798 A1* | 7/2009 | Upp | 726/10 |
| 2009/0217039 A1* | 8/2009 | Kurapati et al. | 713/168 |
| 2009/0227234 A1 | 9/2009 | Bosch et al. | |
| 2009/0239503 A1 | 9/2009 | Smeets | |
| 2009/0249069 A1* | 10/2009 | Daskalopoulos et al. | 713/169 |
| 2009/0258631 A1* | 10/2009 | Forsberg et al. | 455/411 |
| 2009/0282256 A1 | 11/2009 | Rakic et al. | |
| 2010/0167740 A1* | 7/2010 | Vakil et al. | 455/436 |
| 2010/0311419 A1 | 12/2010 | Bi | |
| 2010/0313024 A1 | 12/2010 | Weniger et al. | |
| 2010/0317405 A1* | 12/2010 | Keevill et al. | 455/561 |
| 2011/0010543 A1* | 1/2011 | Schmidt et al. | 713/168 |
| 2011/0086616 A1 | 4/2011 | Brand et al. | |
| 2011/0122813 A1 | 5/2011 | Choe et al. | |
| 2011/0219427 A1* | 9/2011 | Hito et al. | 726/3 |
| 2011/0271330 A1* | 11/2011 | Zhang | 726/5 |
| 2011/0314287 A1 | 12/2011 | Escott et al. | |
| 2012/0144202 A1 | 6/2012 | Counterman | |
| 2012/0233685 A1 | 9/2012 | Palanigounder et al. | |
| 2013/0036223 A1 | 2/2013 | Du et al. | |

FOREIGN PATENT DOCUMENTS

| | | |
|---|---|---|
| CN | 1231108 A | 10/1999 |
| CN | 1684411 A | 10/2005 |
| CN | 1719919 A | 1/2006 |
| CN | 101018174 A | 8/2007 |
| CN | 101026453 A | 8/2007 |
| CN | 101056456 A | 10/2007 |
| CN | 101448257 A | 6/2009 |
| CN | 101945386 A | 1/2011 |
| EP | 1739903 A1 | 1/2007 |
| EP | 2291015 A1 | 3/2011 |
| JP | 2000510303 A | 8/2000 |
| JP | 2002345041 A | 11/2002 |
| JP | 2003535497 A | 11/2003 |
| JP | 2004035538 A | 2/2004 |
| JP | 2004297138 A | 10/2004 |
| JP | 2005078220 A | 3/2005 |
| JP | 2006245831 A | 9/2006 |
| JP | 2007281861 A | 10/2007 |
| JP | 2007336219 A | 12/2007 |
| JP | 2008527905 A | 7/2008 |
| JP | 2009188765 A | 8/2009 |
| JP | 2009278388 A | 11/2009 |
| KR | 20070003484 A | 1/2007 |
| KR | 20100106543 A | 10/2010 |
| WO | WO-9635304 A1 | 11/1996 |
| WO | WO-9636194 A1 | 11/1996 |
| WO | WO-9743866 A2 | 11/1997 |
| WO | WO-0143108 A1 | 6/2001 |
| WO | WO-0149058 A1 | 7/2001 |
| WO | WO2007121190 | 10/2007 |
| WO | WO-2009029156 A1 | 3/2009 |
| WO | 2010039445 A2 | 4/2010 |

OTHER PUBLICATIONS

Chen, et al., "A Secure Relay-Assisted Handover Protocol for Proxy Mobile IPv6 in 3GPP LTE Networks", Wireless Personal Communications, 2010.

International Search Report and Written Opinion—PCT/CN2011/071855, ISA/EPO—Jun. 30, 2011.

Calhoun P., et al., "Diameter Base Protocol RFC 3588", Internet Engineering Task Force (IETF), Sep. 2003, XP015009370.

Eronen P., et al., "Diameter Extensible Authentication RFC 4072", Internet Engineering Task Force (IETF) Aug. 2005, XP015041927.

Funk P., et al., "Extensible Authentication Protocol Tunneled Transport Layer Security Authenticated Protocol Version 0 (EAP-TTLSvO); RFC 5281", Internet Engineering Task Force (IETF), Aug. 2008, XP015060268.

International Search Report and Written Opinion—PCT/US2011/057412—ISA/EPO—Mar. 27, 2012.

Simon D., et al., "The EAP-TLS Authentication Protocol; RFC 5216", Internet Engineering Task Force (IETF), Mar. 1, 2008, XP015055258.

Menezes A J., et al., Handbook of Applied Cryptography, CRC Press, 1997, pp. 403-405.

* cited by examiner

AUTHENTICATION OF ACCESS TERMINAL IDENTITIES IN ROAMING NETWORKS

CLAIM OF PRIORITY UNDER 35 U.S.C. §119

The present Application for Patent claims priority to Provisional Application No. 61/406,017 entitled "Mobile Handset Authentication in a Roaming Network" filed Oct. 22, 2010, and Provisional Application No. 61/435,267 entitled "Mobile Handset Authentication in a Roaming Network" filed Jan. 22, 2011, both assigned to the assignee hereof and hereby expressly incorporated by reference herein.

BACKGROUND

1. Field

Various features disclosed herein relate generally to wireless communication systems, and at least some features pertain more particularly to methods and devices for facilitating authentication of access terminal identities in a roaming network.

2. Background

Access terminals, such as mobile phones, pagers, wireless modems, personal digital assistants, personal information managers (PIMs), personal media players, tablet computers, laptop computers, or any other device with a processor that communicates with other devices through wireless signals are becoming increasingly popular and are used more frequently. Subscribers using such access terminals in a wireless communication network are typically authenticated by the wireless communication network before being granted access to initiate and/or receive calls and transmit and/or receive data. Traditionally, wireless communication networks authenticate a subscriber by verifying a user identity comprising cryptographic information contained in and provided by, for example, an access terminal's Subscriber Identification Module (SIM) for GSM networks, Universal Subscriber Identification Module (USIM) for UMTS/LTE networks and Removable User Identification Module (RUIM) for CDMA networks. These SIMs, USIMs and RUIMs are typically chip and pin based cards that contain information about the subscriber/user of the access terminal and are removable from the access terminal. Users of access terminals equipped with such removable user identity modules are typically able to remove the SIM, USIM or RUIM card from one access terminal and place the card in another access terminal, thereby transferring their subscriber information easily from one access terminal to another. However, cellular networks traditionally do not authenticate the access terminal device itself.

While conventional wireless communication networks are adapted to authenticate the subscriber card (e.g., SIM, USIM, RUIM) being used in an access terminal, it may also be desirable for the wireless communication networks to authenticate the access terminal itself, and deny or allow network access to the access terminal based on the outcome of the access terminal authentication. There are a number of reasons why a network operator would want to authenticate the access terminal in addition to the subscriber card.

One reason includes, for example, authentication of access terminals in order to inhibit use of stolen or lost access terminals. For instance, there is little incentive for a potential thief to steal an access terminal, since a user can report the access terminal as lost or stolen and operation of that lost or stolen access terminal can be blocked from the network, even if a new subscriber card is placed in the terminal.

Another reason includes authentication of access terminals in order to deter unauthorized manufacturers from producing or refurbishing access terminals that are not approved for use within a wireless communication network (e.g., grey market access terminals). Such unauthorized access terminals may not meet the stringent regulations governing, for example, the transmission power, leakage into adjoining bands that are not licensed to the network operator, etc. By utilizing an authentication system that authenticates the access terminal itself, the network operator may deny service to those access terminals produced or refurbished by unauthorized manufacturers that fail to authenticate with valid access terminal identification.

Yet another reason involves the risks of terrorist attacks carried out in part with the use of unauthorized access terminals. Government entities have recently expressed a strong desire that network operators be able to trace, track, authenticate, and disable all access terminals operating within a network operator's wireless communication network. Having the ability to authenticate an access terminal and deny service accordingly would prove advantageous in stopping criminal activities.

There currently exist mechanisms which enable wireless communication networks to query an access terminal's identity (ID). For example, a wireless communication network (e.g., GSM network, WCDMA network, TD-SCDMA network) may query and check an international mobile equipment identity (IMEI) number for 3GPP-compliant access terminals, or a wireless communication network (e.g., CDMA) may query and check a mobile equipment identifier (MEID) for 3GPP2-compliant access terminals. However, these existing mechanisms for obtaining an access terminal's ID fail to provide any assurance that the ID received from an access terminal actually belongs to that access terminal. For example, an unauthorized access terminal could illegally copy or otherwise obtain the ID of an authorized access terminal, and then provide that pirated ID to the requesting wireless communication network. In such a situation, the conventional wireless communication network is unable to distinguish between an authorized access terminal and an unauthorized access terminal employing a faked ID.

Therefore, there is a need for methods, apparatus, and/or systems that are adapted to both discover and validate the identity of an access terminal.

SUMMARY

Various features facilitate the authentication of access terminal identities when an access terminal is roaming within a visited network and is away from its home network.

One feature provides access terminals adapted to facilitate such device authentication. These access terminals may include a wireless communication interface operative to communicate with a visited network, and a processing circuit coupled to the wireless communication interface. The processing circuit may be adapted to obtain a validation key associated with an access terminal identifier of the access terminal. The processing circuit may generate a device authentication message including the access terminal identifier and authentication data generated at least in part using the validation key, and may transmit the device authentication message via the wireless communication interface. The device authentication message is adapted to authenticate the access terminal as an authorized access terminal for accessing the visited network. The processing circuit may further be adapted to receive a notification via the wireless communication interface granting or denying the access terminal access to the visited network based on validation of the device authentication message.

Methods operational in an access terminal are also provided according to a feature for facilitating device authentication of the access terminal while roaming within a visited network. In at least one implementation of such methods, for instance, an access terminal may obtain a validation key associated with an access terminal identifier of the access terminal. A device authentication message may be generated to include the access terminal identifier and authentication data generated at least in part using the validation key. The device authentication message can be transmitted to authenticate the access terminal as an authorized access terminal for accessing the visited network. A notification may be received granting or denying the access terminal access to the visited network based on validation of the device authentication message.

Another feature provides visited validation servers adapted for facilitating device authentication of access terminals roaming within the visited network. According to at least some embodiments, such visited validation servers may include a communication interface adapted to facilitate communication with an access terminal and a processing circuit coupled to the communication interface. The processing circuit can be adapted to receive a device authentication message from the access terminal via the communication interface. The device authentication message may include an access terminal identifier and access terminal authentication data. The processing circuit may further be adapted to authenticate the access terminal based on the received device authentication message. The processing circuit may also be adapted to transmit a notification to the access terminal via the communication interface granting or denying the access terminal access to a visited network.

Methods operational in a visited validation server are also provided according to a feature for facilitating device authentication of access terminals roaming within a visited network. In at least one implementation of such methods, for instance, a visited validation server may receive a device authentication message from an access terminal. The device authentication message may include an access terminal identifier and access terminal authentication data. The access terminal may be authenticated based on the received device authentication message, and a notification may be transmitted to the access terminal, granting or denying the access terminal access to the visited network.

Additional features provide home validation servers for facilitating device authentication of access terminals roaming in a visited network. According to one or more embodiments, such a home validation server may include a communication interface coupled with a processing circuit. The processing circuit may be adapted to receive a transmission requesting device authentication information relating to an access terminal, where the transmission includes an access terminal identifier associated with the access terminal. The transmission may comprise a device authentication message or a request for an authentication token associated with the access terminal. The processing circuit can generate a response including the requested device authentication information (e.g., an indication that a device authentication message has been authenticated, an authentication token). The processing circuit can transmit the response to a visited validation server via the communication interface.

Methods operational in a home validation server are also provided according to a feature for facilitating device authentication of access terminals roaming within a visited network. In at least one implementation of such methods, for instance, a home validation server may receive a transmission requesting device authentication information relating to an access terminal, where the transmission includes an access terminal identifier associated with the access terminal The transmission may comprise a device authentication message or a request for an authentication token associated with the access terminal. A response can be generated to include the requested device authentication information (e.g., an indication that a device authentication message has been authenticated, an authentication token). The processing circuit can transmit the response to a visited validation server via the communication interface.

DETAILED DESCRIPTION

Figure 1:
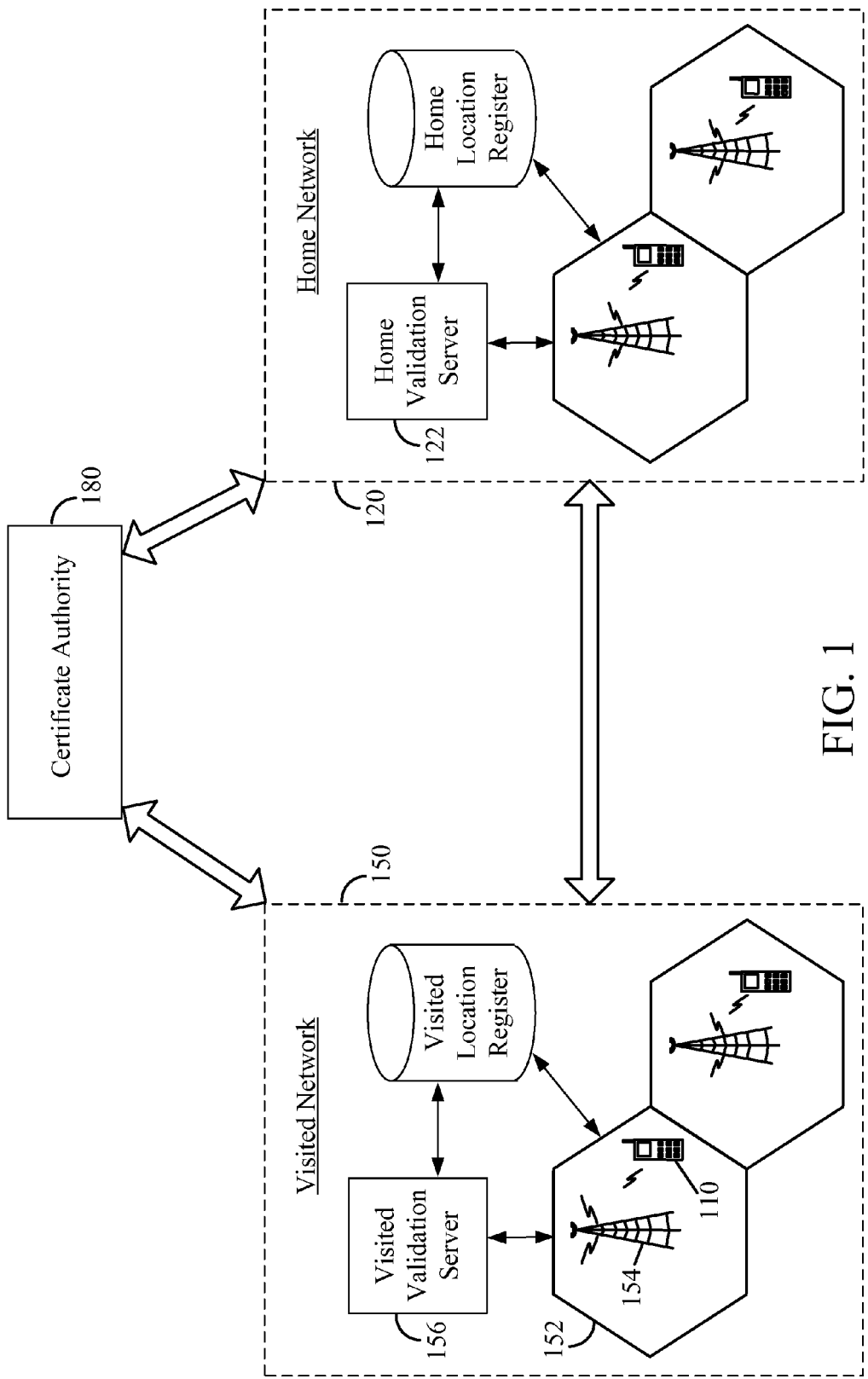
FIG. 1 is a block diagram illustrating an example of a wireless communications environment in which one or more implementations of the present disclosure can find application.

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation. The term "access terminal" as used herein is meant to be interpreted broadly. For example, an "access terminal" may include mobile phones, pagers, wireless modems, personal digital assistants, personal information managers (PIMs), personal media players, tablet computers, laptop computers, and/or other mobile communication/computing devices which communicate, at least partially, through a wireless or cellular network.

Overview

Various methods of authenticating an access terminal are presented in the case where the access terminal is roaming within a visited network and is away from its home network. In addition to subscriber/user authentication, access terminal authentication may be performed. In some embodiments, a device authentication message generated by the access terminal is forwarded by the visited network to the home network for authentication and approval. In other embodiments, the device authentication message is sent from the access terminal directly to the home network for authentication using a global address of the home network, such as an IP address. In other embodiments, the visited network authenticates the access terminal itself by having access to the root certificate to verify the signature transmitted by the access terminals. In other embodiments, the visited network receives a device authentication token from the access terminal and the home network. If the two authentication tokens match, the access terminal is authenticated.

All of the embodiments for access terminal device authentication presented herein may be performed before, after, or concurrently with any other authentication procedures performed to authenticate the subscriber/user (e.g., authentication of the SIM and/or RUIM).

Additionally, according to another aspect, the home network or visited network may send an access terminal authentication request to an access terminal to initiate access terminal authentication. For instance, the home network or visited network may send such a device authentication request to the access terminal upon recognition of a triggering event, such as a subscriber authentication being initiated by/for the access terminal. In response to sending the access terminal authentication request, the access terminal may send its device authentication message to authenticate the access terminal.

Exemplary Network Operating Environment

FIG. 1 illustrates a wireless communications environment in which an access terminal 110 associated with its home network 120 is "roaming" within a visited network 150. For example, the access terminal 110 may be located within a cell 152 serviced by a base station 154 of the visited network 150. In wireless telecommunications, "roaming" is a general term referring to the extension of connectivity service in a location, such as a visited network 150, that is different from the home location where the service was registered, such as the home network 120. Roaming ensures that the access terminal 110 is kept connected to the network, without losing the connection. As illustrated in FIG. 1, the home network 120 and the visited network 150 may be in communication with one another.

The access terminal 110 may desire access to wireless communications provided by means of the visited network 150 in order to send or receive data (e.g., initiate and receive calls, transmit and receive data messages). However, according to at least one feature of the present disclosure, before the access terminal 110 is allowed such access within the visited network 150, both the subscriber and the access terminal device 110 are authenticated in order to ensure that the subscriber is authorized to use the network and that the access terminal device 110 is, for example, an authorized handset made by an authorized original equipment manufacturer (OEM) licensed to make access terminals for use with the network.

In addition to having a removable user identity (or subscriber identity) module identifying subscriber information, such as a Subscriber Identification Module (SIM), a Universal Subscriber Identity Module (USIM), a CDMA Subscriber Identification Module (CSIM) or a Removable User Identification Modules (RUIM), the access terminal 110 also includes an access terminal identifier (ID) unique to the access terminal 110. This access terminal identifier may be, for example, an International Mobile Equipment Identity (IMEI) if the terminal is 3GPP compliant, or a Mobile Equipment Identity (MEID) if the terminal is 3GPP2 compliant. Moreover, the access terminal 110 may include device credentials that are also unique to the access terminal device 110, and which are associated with the access terminal ID. For example, in one embodiment, an OEM of the access terminal 110 may act as an administration authority, such as the certificate authority (CA) 180, which issues a validation key, such as a cryptographic key (e.g., an authentication key) or a digital certificate, to the access terminal 110 and also stores the validation key associated with the access terminal 110. In other embodiments, the validation key can be provisioned using a conventional over-the-air provisioning process, in which the validation key is provided to the access terminal 110 via a wireless transmission. In the various embodiments, the validation key should be stored by the access terminal 110 in such a manner so that it is protected against unauthorized access.

Thus, the access terminal 110 may be provisioned with a validation key, such as a private-public key pair or shared secret key, associated with the access terminal 110 (e.g., associated with the access terminal identifier (ID)) that can be used to digitally sign messages that the access terminal 110 sends to other devices or network components. For example, the access terminal 110 may digitally sign a message it intends to send to a recipient using a private key. Then, the recipient of the message can use the public key associated with the access terminal ID to verify that the message was indeed sent by the access terminal 110. Since the CA 180 holds all the public keys of all the access terminals and certifies them to be authentic, recipients can trust that the digitally signed data and certificates are associated with a valid access terminal 110. As illustrated in FIG. 1, the CA 180 may be in communication with the visited network 150 and the home network 120.

In one embodiment, the CA 180 can belong to the OEM of the access terminals and can take the role of a root CA and issue digital certificates to their access terminals directly. Alternatively, the OEM can serve as an intermediate CA and issue certificates to their own access terminals, while the root CA may be a global or regional device identification management authority. In that case, the root CA issues certificates to each of the OEM CAs. All certificates on the certificate chain should be provisioned to the access terminal 110. The access terminal's 110 ID may be part of the access terminal certificate. In addition, the OEM should provision the private key to the access terminal 110, and the private key should be protected against unauthorized access.

In other embodiments, the validation key may comprise a shared secret key. In such embodiments, the access terminal 110 may not utilize a digital certificate public-key infrastructure, but instead stores the shared secret key associated with its access terminal identity (ID). The shared secret key should only be known to the access terminal 110 and also the home network 120. For example, the shared secret key may be stored at a validation server 122 of the home network 120. Such shared secret keys may be provisioned by, for example, the device manufacturer.

Each network operator has a local validation server. For example, the visited network 150 may include a visited validation server 156 and the home network 120 may include the home validation server 122. The visited validation server 156 (e.g., enforcement node) may be in charge of authenticating a given access terminal 110 and allowing communications access to the network. In the embodiments where the access terminal 110 comprises the public-key certificate, the home network 120 makes available to the home validation server 122 a list of trusted access terminal root certificates and/or trusted OEM certificates. In the embodiments where a shared secret key is stored at the access terminal 110 instead, each authorized access terminal ID and their corresponding shared secret keys are available to the home validation server 122.

Authentication of the access terminal 110, which is distinct from authentication of a subscriber, can be performed by the visited network 150 or by the home network 120. It is up to the network operator to decide which of the following methods to use for access terminal 110 authentication. However, the authentication result is typically enforced by the visited network 150 for granting or denying the access terminal 110 network access. The enforcement node (EN) of the visited network 150 may be a part of the visited validation server 156 of the visited network 150, but in some embodiments it may be independent to the visited validation server 156.

Exemplary Pass-Through Device Authentication

Figure 2:
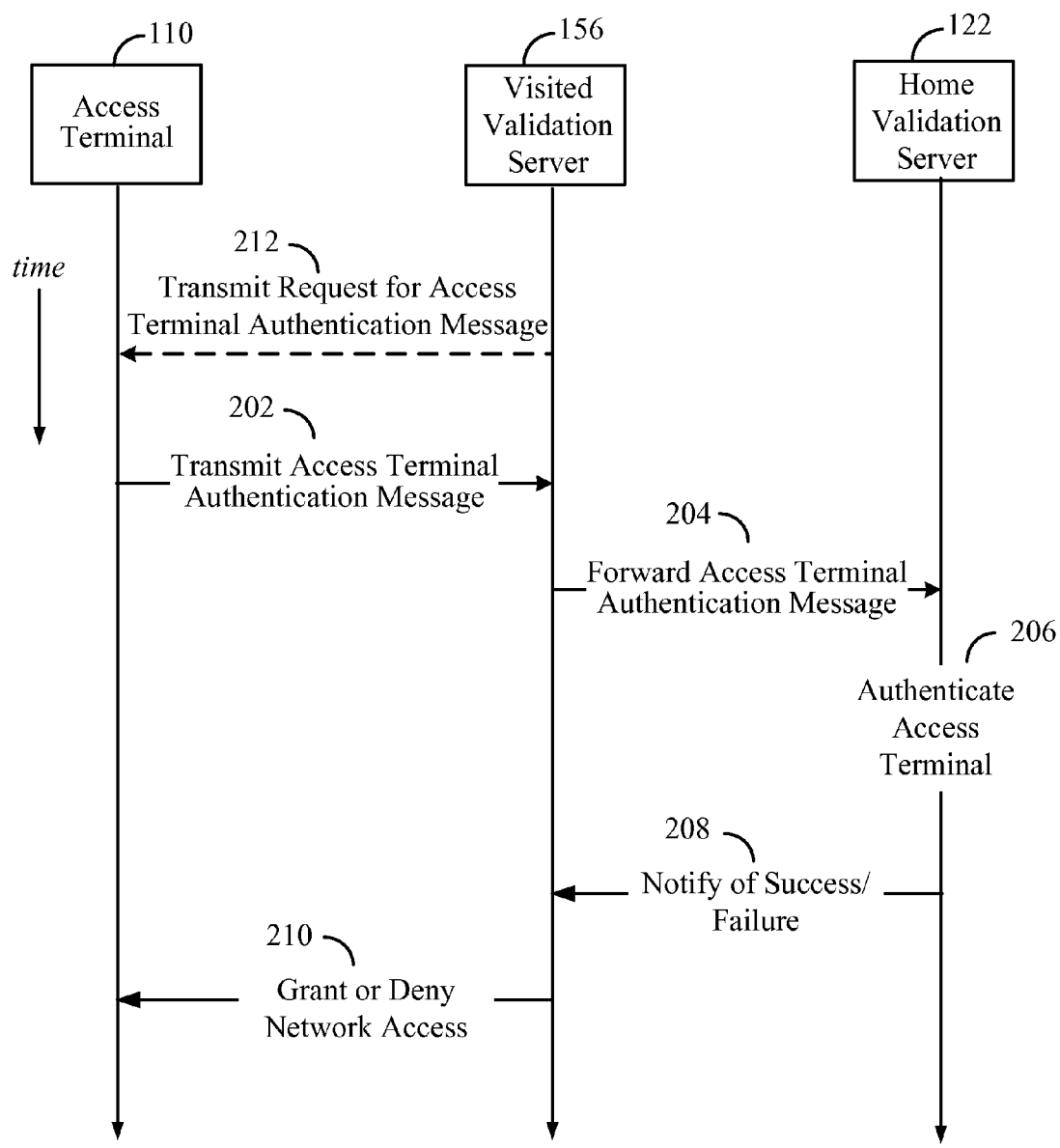
FIG. 2 is a flow diagram illustrating an example of authenticating an access terminal roaming within a visited network where the device authentication is performed by a home validation server of a home network.

Referring to FIG. 2, in one embodiment, authentication of the access terminal 110 is performed by the home validation server 122 of the home network 120. In step 202, the access terminal 110 transmits an access terminal (or device) authentication message to the visited validated server 156 at the visited network 150. The device authentication message includes information unique to the access terminal 110. For example, the device authentication message may include the access terminal ID and a digital signature generated using the validation key associated with the access terminal ID. In some embodiments, the device authentication message will include a random element, such as a nonce (e.g., cryptographic nonce or number used once) to prevent replay attacks by other unauthorized access terminals. The device authentication message may be in the form of an SMS, IP data packets, or in any other formats accepted at the visited network 150, and may include information about the access terminal's 110 home network 120. In step 204, the visited validation server 156 forwards this access terminal authentication message to the home network 120.

In step 206, the home validation server 122 authenticates the access terminal 110 using the device authentication message. For example, the home validation server 122 may verify a digital signature within the device authentication message that may have been signed by the access terminal 110 using the terminal's 110 private key associated with a public key infrastructure. Using the public key corresponding to the access terminal's 110 identity (ID) that may be known or otherwise accessible to the home network 120, the home validation server 122 may attempt to verify the digital signature. If verification using the public key is successful the access terminal 110 may be authenticated because only an authorized access terminal 110 would have access to both the access terminal identity (ID) and the associated validation key used to sign the data. In various embodiments, verification of the digital signature may include obtaining a certificate stored, for example, at a server in the home network 120 (e.g., the home validation server 122), a Certificate Authority 180, received from the access terminal 110, or obtained from any trusted third party.

In another embodiment, the home validation server 122 may verify a digital signature within the device authentication message that may have been signed by the access terminal 110 using the access terminal's 110 shared secret key. In this case the home validation server 122 verifies the digital signature using the shared secret key corresponding to the access terminal identity (ID), which is stored within the home network at, for example, the home validation server 122.

In step 208, the home validation server 122 notifies the visited validation server 156 of whether the authentication succeeded or failed. In step 210, the visited validation server 156 then grants or denies the requesting access terminal 110 access to the network based on the authentication results reported by the home validation server 122. Note that such a grant or denial of access to the access terminal 110 may be separate and distinct from a separate prior, concurrent, or subsequent subscriber authentication process. For instance, in some implementations the access terminal authentication message 202 may be part of a combined authentication process that also includes a subscriber authentication process.

The access terminal 110 may transmit the access terminal authentication message 202 on its own initiative, in at least some implementations. For example, the access terminal 110 may generate and/or transmit the access terminal authentication message 202 to the visited validation server 156 on its own initiative as part of a general process for requesting access to the network, such as the combined authentication process that also includes the subscriber authentication process.

In other implementations, the access terminal 110 may generate and/or transmit the access terminal authentication message 202 in response to an access terminal authentication request 212 transmitted from the visited validation server 156. For example, the access terminal 110 may request access to the network, whereupon the visited validation server 156 may transmit a request 212 for the access terminal 110 to transmit the access terminal authentication message 202. It may be that an access terminal authentication message 202 was sent and not received by the visited validation server 156, or it may be that no access terminal authentication message 202 was transmitted from the access terminal 110. In some implementations, the visited validation server 156 may send a request 212 at periodic intervals (e.g., every 30 seconds, every 2 hours, every 24 hours, etc.) in order to periodically authenticate the access terminal 110. In some examples, if the visited validation server 156 does not receive an access terminal authentication message 202 within a predefined period of time after transmitting a request 212, a subsequent request 212 may be sent. After the visited validation server 156 has sent a predefined number of requests 212 for the access terminal authentication message 202 from the access terminal 110 and no access terminal authentication message 202 is forthcoming, the visited validation server 156 may deny network access to the access terminal 110.

In yet other implementations, the access terminal authentication request 212 may be a failover feature, where the visited network validation server 156 sends the request 212 if it has not received a device authentication message from the access terminal within a period of time after the access terminal subscriber/user authentication has been initiated or after the access terminal 110 has connected to the visited network.

Exemplary Device Authentication by Home Validation Server

Figure 3:
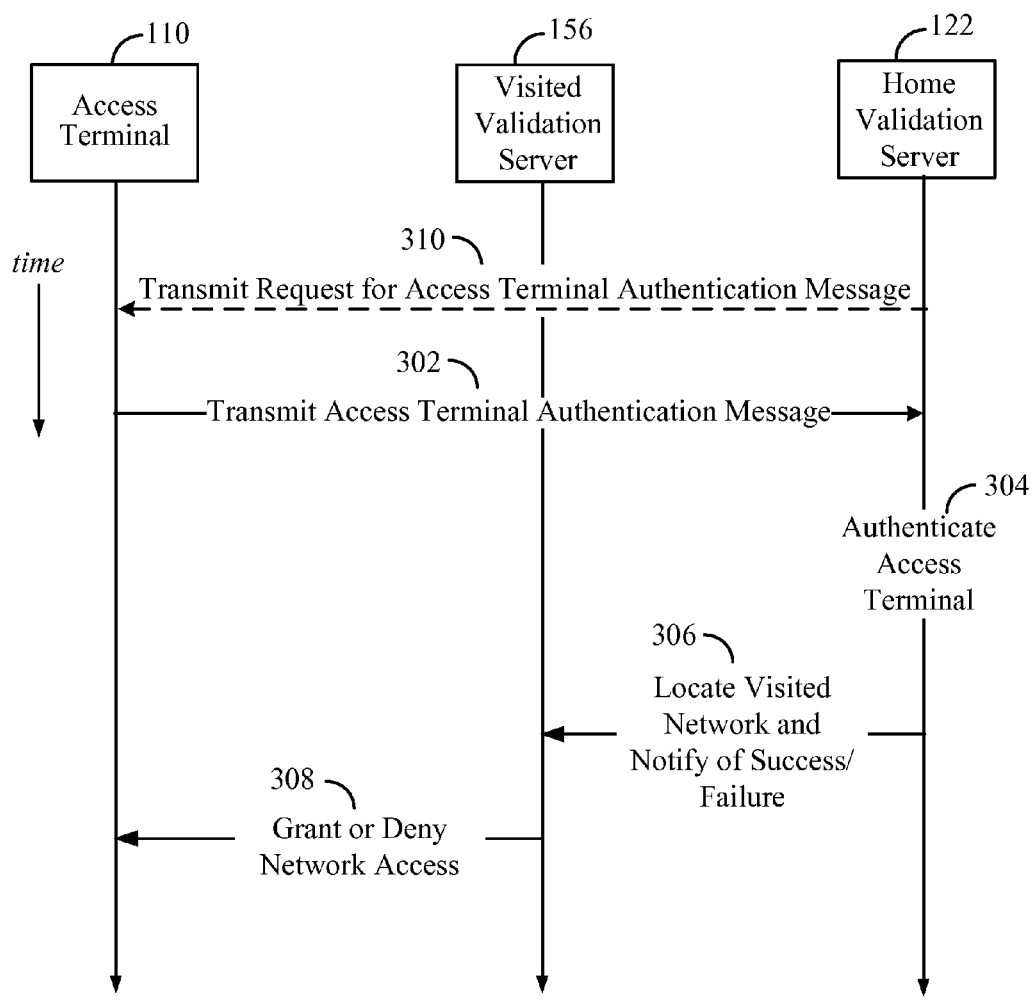
FIG. 3 is a flow diagram illustrating another example of authenticating an access terminal roaming within a visited network where the device authentication is performed by a home validation server of a home network.

FIG. 3 illustrates another embodiment for authenticating an access terminal 110 that may be roaming within a visited network 150 where the device authentication is performed by the home network 120. In step 302, the access terminal 110 transmits an access terminal (or device) authentication message directly to the home validation server 122. The home validation server 122 has a globally routable address, such as an IP address, and/or a globally routable directory number for SMS messages that the access terminal 110 can use to directly send the device authentication message and other data. Since the access terminal 110 is roaming within the visited network 150, the access terminal 110 may be granted limited access by the visited network 150 in order to enable the access terminal 110 to transmit the device authentication message to the home validation server 122. For example, the access terminal 110 may be allowed limited access to a data channel, or the access terminal 110 may be able to employ the same channel used for subscriber authentication in order to send the device authentication message to the home validation server 122.

The device authentication message includes information unique to the access terminal 110. For example, the device authentication message may include the access terminal ID and a digital signature generated using the validation key associated with the access terminal ID. In some embodiments, the device authentication message will include a random element, such as a nonce (e.g., cryptographic nonce or number used once) to prevent replay attacks by other unauthorized access terminals. The device authentication message may also include information about what visited network 150 the access terminal 110 is attempting to get network access from.

After receiving the device authentication message, in step 304, the home validation server 122 authenticates the access terminal 110 using the device authentication message. For example, the home validation server 122 may verify a digital signature within the device authentication message that may have been signed by the access terminal 110 using the terminal's 110 private key associated with a public key infrastructure. Using the public key corresponding to the access terminal's 110 identity (ID) that is known or otherwise accessible to the home network 120, the home validation server 122 may attempt to verify the digital signature. If verification using the public key is successful the access terminal 110 may be authenticated because only an authorized access terminal 110 would have access to both the access terminal ID and the associated validation key used to sign the data. In various embodiments, verification of the digital signature may include obtaining a certificate stored, for example, at a server in the home network 120 (e.g., the home validation server 122), a Certificate Authority 180, received from the access terminal 110, or received from any trusted third party.

In another embodiment, the home validation server 122 may verify a digital signature within the device authentication message that may have been signed by the access terminal 110 using a shared secret key of the terminal 110. In this case the home validation server 122 verifies the digital signature using the shared secret key corresponding to the access terminal ID, which is stored within the home network, for example, at the home validation server 122.

In step 306, the home validation server 122 locates the visited validation server 156 and/or the visited network 150 based on the information provided by the access terminal 110. The home validation server 122 notifies the visited validation server 156 of whether the authentication succeeded or failed. In step 308, the visited validation server 156 then grants or denies the requesting access terminal 110 access to the network based on the authentication results reported by the home validation server 122.

In at least some implementations, the access terminal 110 may transmit the device authentication message at step 302 on its own initiative. For example, the access terminal 110 may generate and/or transmit the access terminal authentication message to the home validation server 122 on its own initiative as part of general process for requesting access to the network.

In one or more other implementations, the access terminal 110 may generate and/or transmit the device authentication message in response to a request transmitted from at least one of the home validation server 122 or the visited validation server 156. For example, the access terminal 110 may request access to the network, whereupon the home validation server 122 may transmit, at optional step 310, a request for the access terminal 110 to transmit the device authentication message. It may be that a device authentication message was sent and not received by the home validation server 122, or it may be that no device authentication message was transmitted from the access terminal 110. In some implementations, the visited validation server 156 may send a request 212 at periodic intervals (e.g., every 30 seconds, every 2 hours, every 24 hours, etc.) in order to periodically authenticate the access terminal 110. In some examples, if the home validation server 122 does not receive a device authentication message within a predefined period of time after transmitting a request, a subsequent request may be sent. After the home validation server 122 has sent a predefined number of requests for the device authentication message from the access terminal 110 and no device authentication message has been forthcoming, the home validation server 122 may notify the visited validation server 156 that authentication of the access terminal 110 has failed, and the visited validation server 156 may deny network access to the access terminal 110.

In yet another implementation, the access terminal authentication request 310 may be a failover feature, where the home network validation server 122 sends the request 310 if it has not received a device authentication message from the access terminal within a period of time after the access terminal subscriber/user authentication has been initiated or after the access terminal has connected to the visited network and/or home network.

Exemplary Device Authentication by Visited Validation Server

Figure 4:
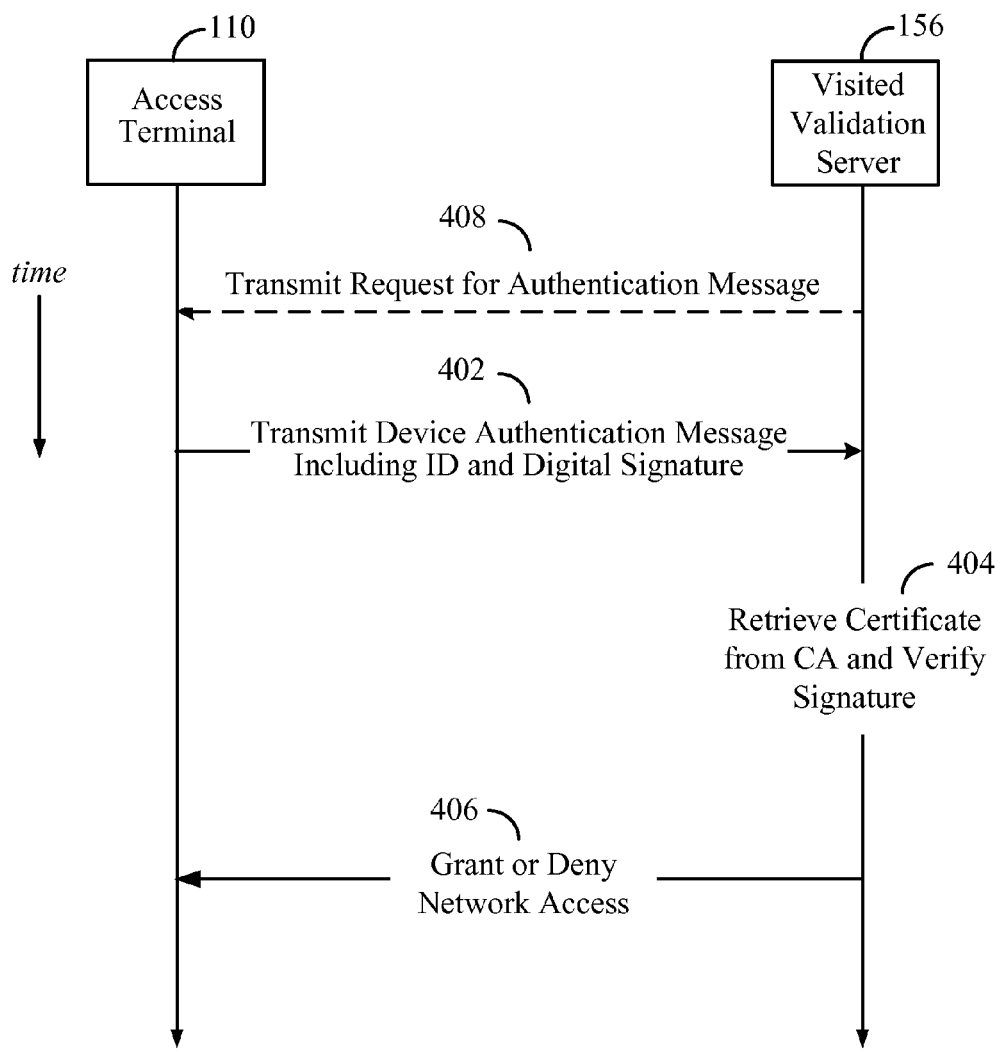
FIG. 4 is a flow diagram illustrating an example of authenticating an access terminal roaming within a visited network where the device authentication is performed by a visited validation server.

FIG. 4 illustrates another embodiment for authenticating an access terminal 110 roaming within a visited network 150 where the device authentication is performed by the visited network 150. At step 402, the access terminal 110 transmits an access terminal (or device) authentication message to the visited validation server 156. In this embodiment, the access terminal 110 is part of a public-key infrastructure (PM) scheme and has been issued a public/private key pair by a CA 180 and is certified by the CA 180. The device authentication message may include the whole certification chain or information that leads to the public-key certificate. For example, the device authentication message may include a URL or index that directs the visited validation server 156 to the CA 180 which stores the certificates. In one embodiment, the visited validation server 156 is equipped with the root certificates or has access to the CA 180.

At step 404, the visited validation server 156 authenticates the access terminal 110 based on the device authentication message received. For example, the visited validation server 156 may access the CA 180 based on the URL provided within the device authentication message and verifies that the access terminal 110 is an authorized access terminal device. In one embodiment, the visited validation server 156 may attempt to verify the digital signature within the device authentication message that may have been digitally signed by the access terminal 110 using the private key associated with the access terminal ID. Using the public key corresponding to the access terminal ID, which may be obtained from the CA 180, the visited validation network 156 may attempt to verify the digital signature. If verification of the digital signature using the public key is successful the access terminal 110 may be authenticated because only an authorized access terminal 110 would have access to both the access terminal ID and the private key used to sign the data. In one embodiment, the visited validation server 156 does not need to contact the CA 180, but rather, the visited validation server 156 and/or the visited network 150 itself can store the certificates employable to verify the digital signature sent by the access terminal 110 within the device authentication message. In other embodiments, the visited validation server 156 may receive the certificates for verifying the digital signature from the access terminal 110.

At step 406, the visited validation server 156 grants or denies network access to the access terminal 110 based on whether the device authentication was successful or a failure.

In at least some implementations, the access terminal 110 may transmit the device authentication message at step 402 on its own initiative. For example, the access terminal 110 may generate and/or transmit the device authentication message to the visited validation server 156 on its own initiative as part of general process for requesting access to the network.

In one or more other implementations, the access terminal 110 may generate and/or transmit the device authentication message at step 402 in response to a request transmitted from the visited validation server 156. For example, the access terminal 110 may request access to the network, whereupon the visited validation server 156 may transmit, at optional step 408, a request for the access terminal 110 to transmit the device authentication message. It may be that a device authentication message was sent and not received by the visited validation server 156, or it may be that no device authentication message was transmitted from the access terminal 110. In some implementations, the visited validation server 156 may send a request 212 at periodic intervals (e.g., every 30 seconds, every 2 hours, every 24 hours, etc.) in order to periodically authenticate the access terminal 110. In some examples, if the visited validation server 156 does not receive a device authentication message within a predefined period of time after transmitting a request, a subsequent request may be sent. After the visited validation server 156 has sent a predefined number of requests for the device authentication message from the access terminal 110 and no device authentication message has been forthcoming, the visited validation server 156 may deny network access to the access terminal 110.

In yet another implementation, the access terminal authentication request 408 may be a failover feature, where the visited network validation server 156 sends the request 408 if it has not received a device authentication message from the access terminal within a period of time after the access terminal subscriber/user authentication has been initiated or after the access terminal has connected to the visited network.

Exemplary Device Authentication Using Device Authentication Token

Figure 5:
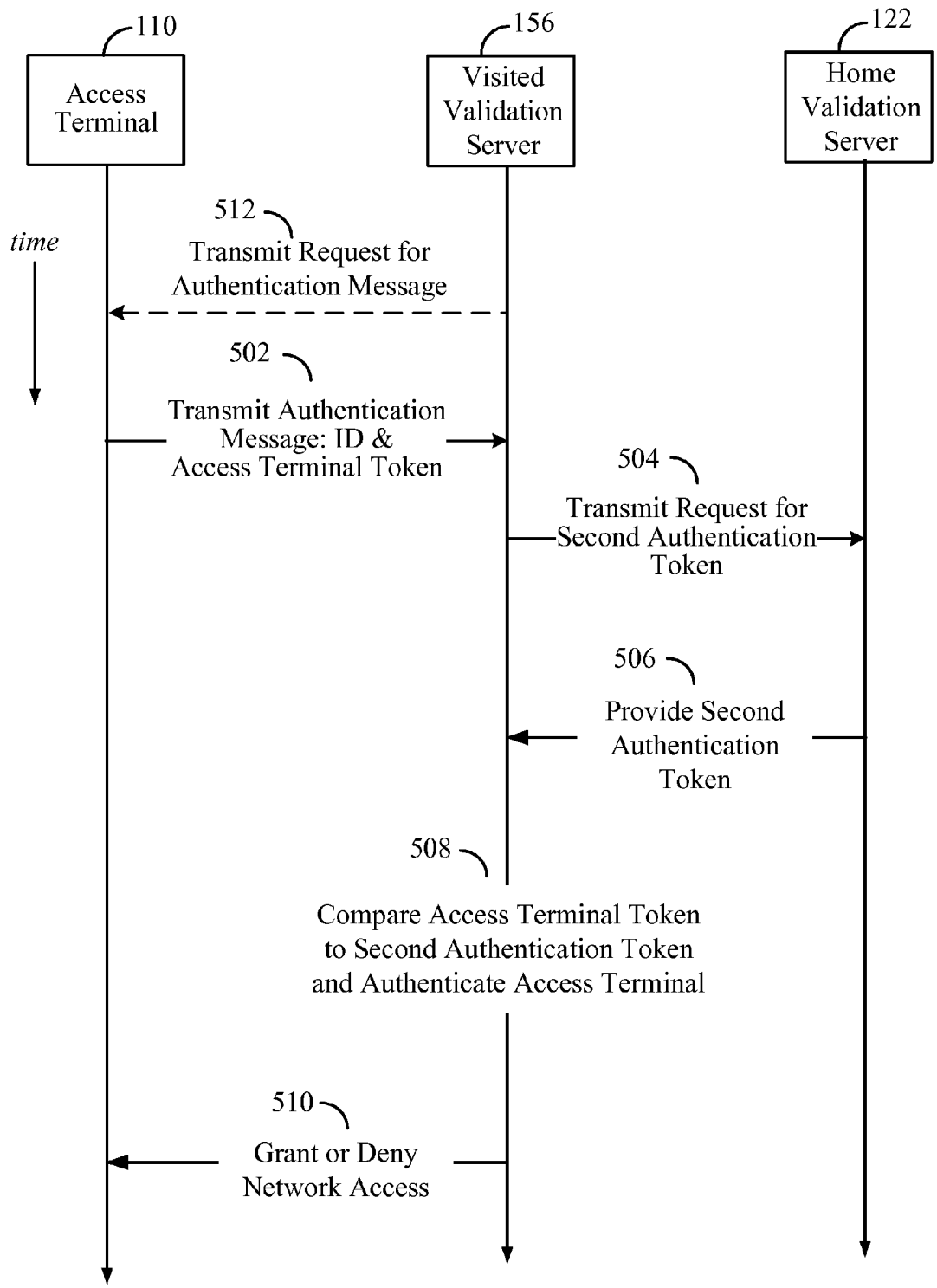
FIG. 5 is a flow diagram illustrating an example of authenticating an access terminal roaming within a visited network where the device authentication is performed using a device authentication token.

FIG. 5 illustrates another embodiment for authenticating an access terminal 110 roaming within a visited network 150 where device authentication is performed by the visited network 150. In this embodiment, device authentication is performed using device authentication tokens that are received from the access terminal 110 and the home network 120. At step 502, the access terminal 110 transmits an access terminal (or device) authentication message to the visited validation server 156. The device authentication message includes the access terminal ID and a device authentication token. The device authentication token may be a message digitally signed by the access terminal 110 using its validation key (e.g., a private key or a shared secret key). In some embodiments, the device authentication message will include a random element, such as a nonce, that it digitally signs and/or date and time data to prevent replay attacks.

At step 504, the visited validation server 156 transmits a request for a device authentication token from the home validation server 122, where the request includes, among other things, the access terminal's 110 ID number and/or any nonce information associated with the device authentication message transmitted by the access terminal 110. At step 506, the home validation server 122 generates a corresponding device authentication token using the given access terminal ID and any nonce information provided by the visited validation server 156. In some embodiments, the home validation server 122 may store in advance device authentication tokens corresponding to each access terminal ID. In such cases, the home validation server 122 and access terminal 110 may have a system for preventing replay attacks in advance. For example, the device authentication message transmitted by the access terminal in step 502 may contain a number that is updated according to a sequence known by the home validation server 122. At step 508, the visited validation server 156 authenticates the access terminal 110 by comparing the device authentication token provided by the access terminal 110 with the device authentication token provided by the home validation server 122. If the two tokens match then device authentication is successful/passed. If the two tokens do not match then device authentication fails.

At step 510, the visited validation server 156 grants or denies network access to the access terminal 110 based on whether or not the device authentication from step 508 was successful.

In at least some implementations, the access terminal 110 may transmit the device authentication message at step 502 on its own initiative. For example, the access terminal 110 may generate and/or transmit the device authentication message to the visited validation server 156 on its own initiative as part of general process for requesting access to the network.

In one or more other implementations, the access terminal 110 may generate and/or transmit the device authentication message at step 502 in response to a request transmitted from at least one of the visited validation server 156 or the home validation server 122. For example, the access terminal 110 may request access to the network, whereupon the visited validation server 156 may transmit, at optional step 512, a request for the access terminal 110 to transmit the device authentication message. It may be that a device authentication message was sent and not received by the visited validation server 156, or it may be that no device authentication message was transmitted from the access terminal 110. In some implementations, the visited validation server 156 may send a request 212 at periodic intervals (e.g., every 30 seconds, every 2 hours, every 24 hours, etc.) in order to periodically authenticate the access terminal 110. In some examples, if the visited validation server 156 does not receive a device authentication message within a predefined period of time after transmitting a request, a subsequent request may be sent. After the visited validation server 156 has sent a predefined number of requests for the device authentication message from the access terminal 110 and no device authentication message has been forthcoming, the visited validation server 156 may deny network access to the access terminal 110.

In yet another implementation, the access terminal authentication request 512 may be a failover feature, where the visited network validation server 156 sends the request 512 if it has not received an access terminal authentication message from the access terminal 110 within a period of time after the subscriber/user authentication has been initiated or after the access terminal has connected to the visited network and/or home network.

Exemplary Access Terminal

Figure 6:
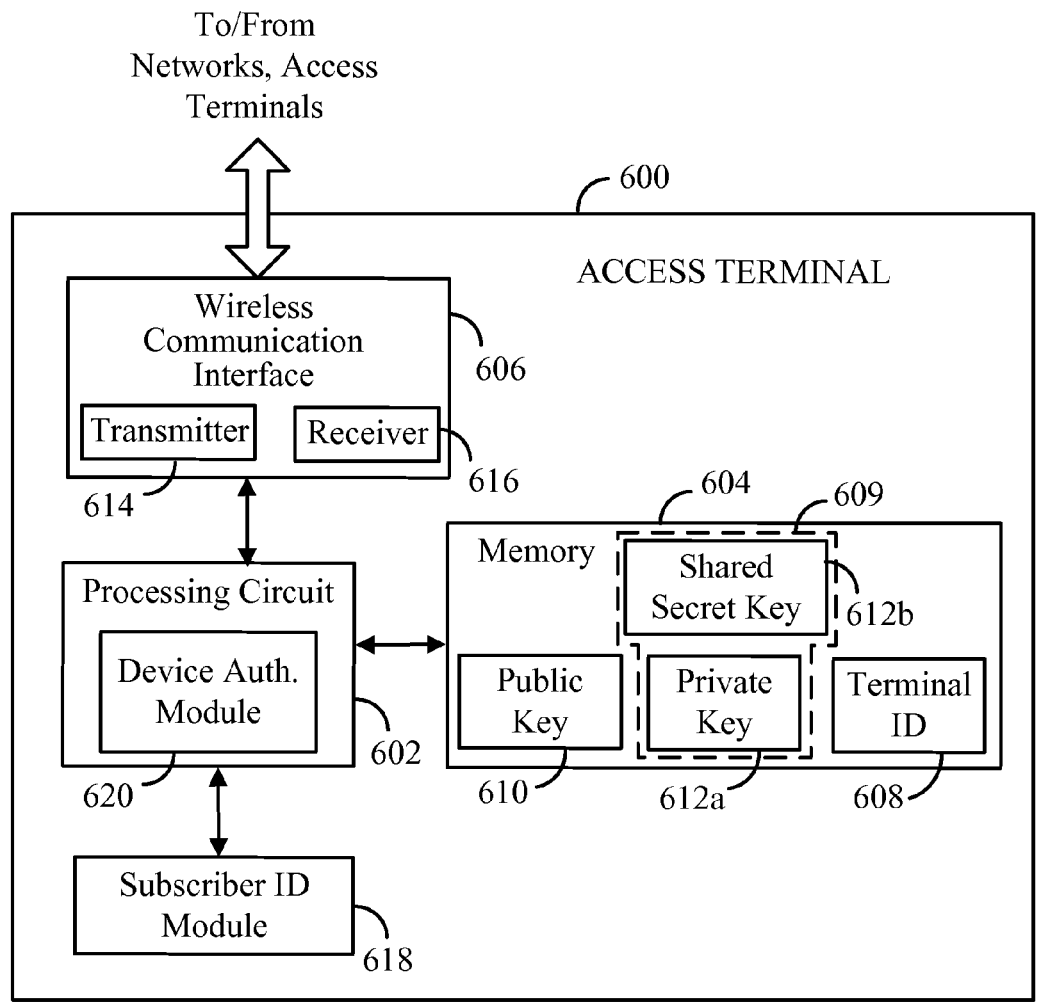
FIG. 6 illustrates a functional block diagram of at least one embodiment of an access terminal

FIG. 6 illustrates a functional block diagram of at least one embodiment of an access terminal 600. The access terminal 600 may generally include a processing circuit 602 (e.g., processor, processing module, etc.) coupled to a memory circuit (e.g., memory module, memory, etc.) 604 and a wireless communication interface 606.

The processing circuit 602 is arranged to obtain, process and/or send data, control data access and storage, issue commands, and control other desired operations. The processing circuit 602 can be coupled to the memory circuit 604 such that the processing circuit 602 can read information from, and write information to, the memory circuit 604. In the alternative, the memory circuit 604 may be integral to the processing circuit 602. According to at least one embodiment, the processing circuit 602 may include a device authentication module/circuit 620 for performing the various steps of authenticating the access terminal 600.

The memory circuit 1004 can store an access terminal identifier (ID) 608 and/or a validation key 609 (e.g., private key from a public/private key pair, shared secret key, etc.), according to various embodiments. For example, in some embodiments, where the access terminal 600 is provisioned with a public/private key pair, the memory circuit 604 may store a public key 610 and a private key 612*a*. In other embodiments, where the access terminal 600 is part of a symmetric shared secret key cryptography scheme, the memory circuit 604 may store a shared secret key 612*b*.

The validation key 609 (e.g., private key 612*a*, shared secret key 612*b*) and/or the access terminal ID 608 may be stored in a portion of the memory circuit 604 that is read/write protected. Thus, access to this protected area by an end user of the access terminal 600, such as the subscriber, may not be allowed. Such protection may help protect the confidentiality of the validation key 609 and/or access terminal ID 608 from being compromised.

The wireless communication interface 606 allows the access terminal 600 to communicate with one or more access terminals over a wireless network. The wireless communication interface 606 also allows the access terminal 600 to communicate with one or more networks, such as a home network (e.g., home network 120 in FIGS. 1) and a visited network (e.g., visited network 150 in FIG. 1), including their components (e.g., the home validation server 122 and visited validation server 156). The wireless communicating interface 606 may include wireless transceiver circuitry, including a transmitter 614 and/or a receiver 616 (e.g., one or more transmitter/receiver chains).

The access terminal 600 can also include a subscriber (or user) identity module 618 coupled to the processing circuit 602. The subscriber identity module 618 may comprises any conventional subscriber identity module, such as a Subscriber Identification Module (SIM), a Universal Subscriber Identity Module (USIM), a CDMA Subscriber Identification Module (CSIM) or a Removable User Identification Modules (RUIM). The subscriber identity module can comprise cryptographic subscriber information contained therein, and adapted for use in conventional subscriber authentication procedures.

According to one or more features, the processing circuit 602 of the access terminal 600 may be adapted to perform any or all of the processes, functions, steps and/or routines related to the various access terminals described above with reference to FIGS. 1-5 (e.g., access terminal 110). As used herein, the term "adapted" in relation to the processing circuit 602 may refer to the processing circuit 602 being one or more of configured, employed, implemented, or programmed to perform a particular process, function, step and/or routine according to various features described herein.

Figure 7:
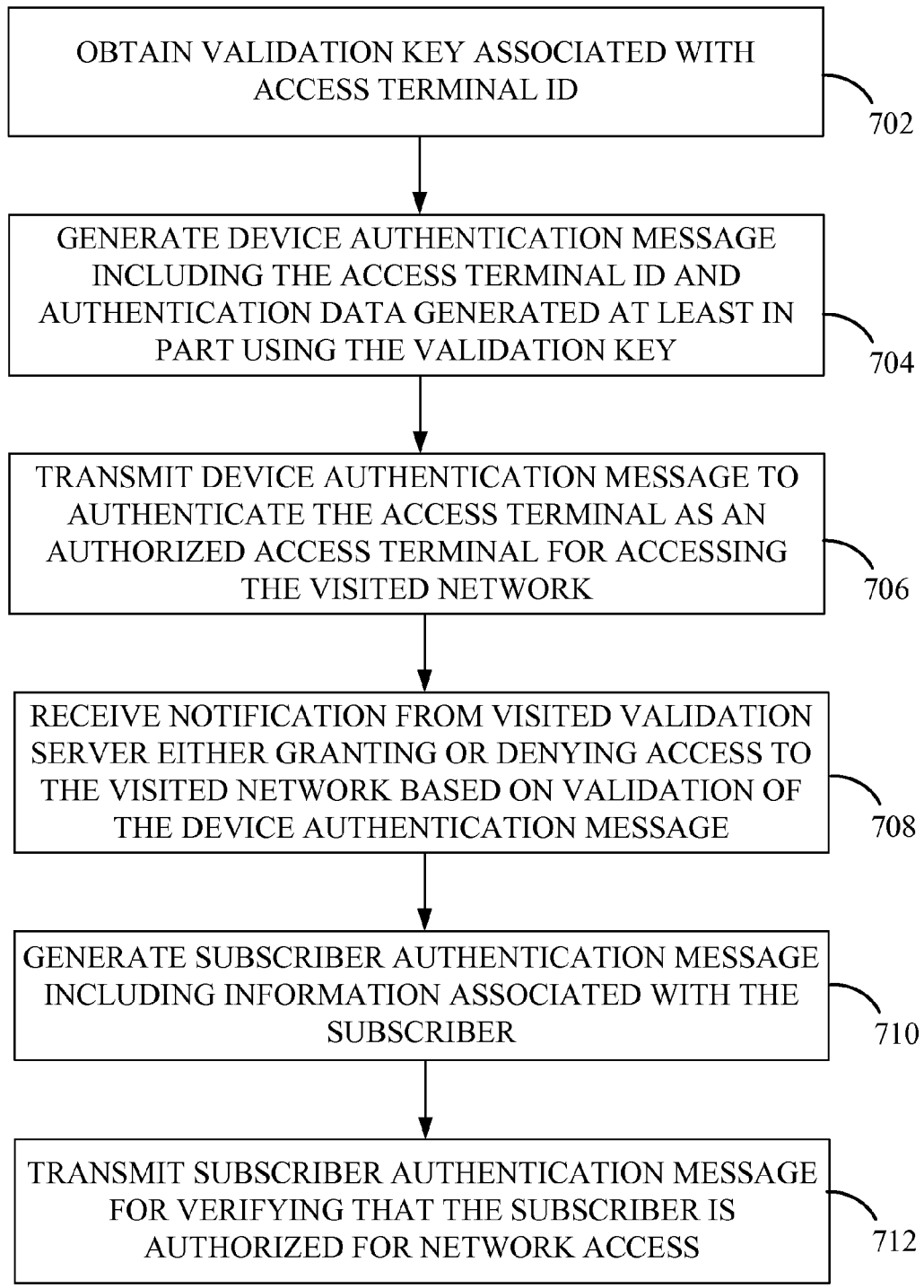
FIG. 7 is a flow diagram illustrating an example of a method operational in an access terminal for facilitating device authentication of the access terminal when the access terminal is roaming within a visited network.

FIG. 7 is a flow diagram illustrating an example of a method operational in an access terminal, such as access terminal 600, for facilitating device authentication of the access terminal when the access terminal is roaming within a visited network. Referring to FIGS. 6 and 7, an access terminal 600 may initially obtain a validation key associated with an access terminal identifier (ID) of the access terminal 600. For example, a validation key 609, such as a private/public key pair (e.g., public key 610 and private key 612*a*) or shared secret key 612*b*, can be provisioned into a secured portion of the memory circuit 604. According to various implementations, the validation key 609 can be provisioned by the access terminal manufacturer, by an over-the-air provisioning process or as otherwise known in the art for securely provisioning an access terminal with a validation key. The validation key is associated with the access terminal ID 608, such that it can be used to validate the access terminal ID is authentic.

At step 704, a device authentication message can be generated, where the device authentication message includes the access terminal ID and authentication data generated at least in part using the validation key. For instance, the device authentication module 620 of the processing circuit 602 may generate the device authentication message, which message may include the access terminal ID 608 and the authentication data generated using the validation key. In at least some implementations, the authentication data may be generated by the processing circuit 602 (e.g., the device authentication module 620) using the validation key 609, such as the private key 612*a* or shared secret key 612*b*, to digitally sign the device authentication message using any conventional signature algorithm. In one or more other implementations, the authentication data may be generated by the processing circuit 602 (e.g., the device authentication module 620) using the validation key 609 to generate an access terminal authentication token.

At step 706, the access terminal 600 transmits the device authentication message to be employed to authenticate that the access terminal 600 as an authorized device for accessing a visited network. For example, the processing circuit 602 may transmit the device authentication message via the wireless communication interface 606. In some implementations, the device authentication message may be transmitted to a visited validation server, to be forwarded by the visited validation server to a home validation server within a home network, or to be used by the visited validation for verifying the device authentication message. In such cases, the device authentication message may include information for forwarding the message to the home validation server. In other implementations, the device authentication message may be transmitted to the home validation server. In such instances, the processing circuit 602 may employ a globally routable address of the home validation server for directing the message to the home validation server.

At step 708, the access terminal 600 can receive from the visited validation server a notification granting or denying access to the visited network. For example, the processing circuit 602 can receive a notification via the wireless communication interface 606, which notification may be transmitted from the visited network. If access is granted to the visited network, the processing circuit 602 can communicate via the visited network using the wireless communication interface 606 to send and receive communications.

At step 710, the access terminal 600 may also generate a subscriber authentication message. For example, the processing circuit 602 may generate a subscriber authentication message using subscriber information stored in the subscriber identity module 618 and/or processes performed by the subscriber identity module 618. The subscriber authentication message can be transmitted by the access terminal 602 using the wireless communication interface 606 for verifying that the subscriber is authorized for network access at step 712. The subscriber authentication can be carried out according to conventional subscriber authentication procedures, as are known generally in the art and are therefore not detailed herein. According to various implementations, the subscriber authentication process can be carried out prior, concurrent or subsequent to the device authentication process of steps 702 and 704.

Exemplary Visited Validation Server

Figure 8:
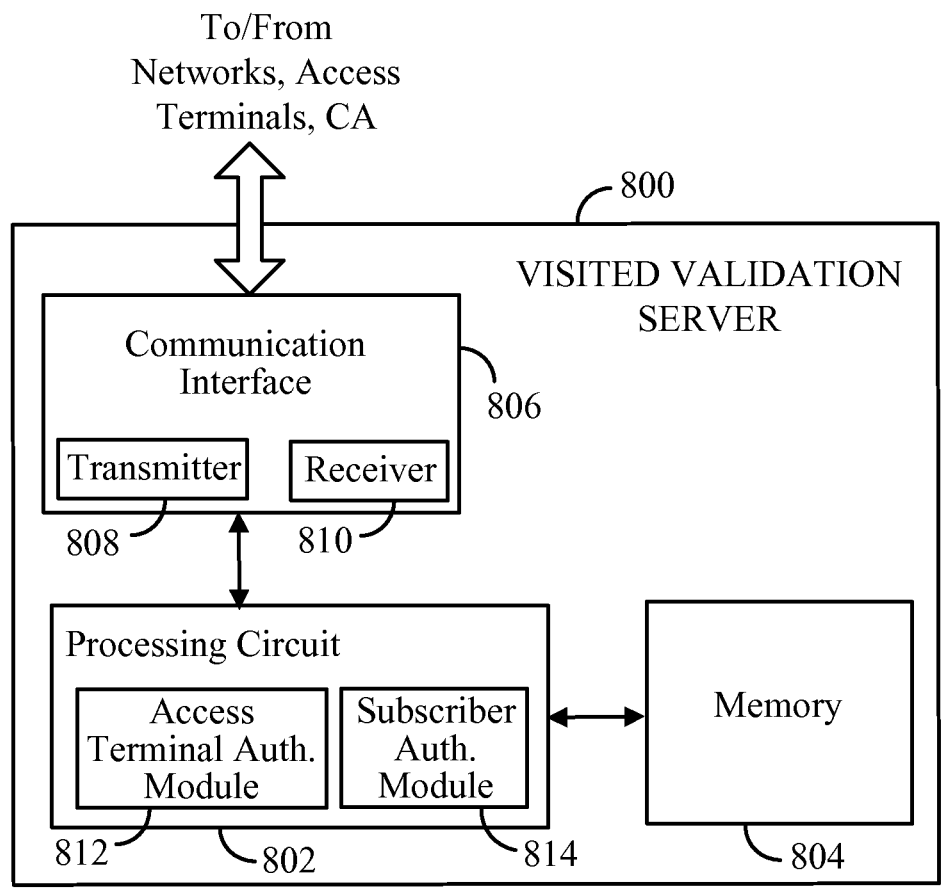
FIG. 8 illustrates a functional block diagram of at least one embodiment of a visited validation server.

FIG. 8 illustrates a functional block diagram of at least one embodiment of a visited validation server 800. The visited validation server 800 may generally comprise a processing circuit 802 coupled to a memory circuit 804 and a communication interface 806.

The processing circuit 802 is arranged to obtain, process and/or send data, control data access and storage, issue commands, and control other desired operations. The processing circuit 802 can be coupled to the memory circuit 804 such that the processing circuit 802 can read information from, and write information to, the memory circuit 804. In the alternative, the memory circuit 804 may be integral to the processing circuit 802. According to at least one embodiment, the processing circuit 802 can include an access terminal authentication module/circuit 812 adapted to perform the various steps for authenticating an access terminal according to one or more of the access terminal authentication procedures described herein. The processing circuit 802 may also include a subscriber authentication module/circuit 814 adapted to perform subscriber authentication procedures according to conventional subscriber authentication practices.

The communication interface 806 may comprise a transmitter 808 and/or a receiver 810 to transmit and receive data to/from access terminals (e.g., access terminal 110 in FIG. 1), certificate authority servers (e.g., CA 180 in FIG. 1), and/or other networks (e.g., home network 120 in FIG. 1).

According to one or more features, the processing circuit 802 of the visited validation server 800 may be adapted to perform any or all of the processes, functions, steps and/or routines related to the visited validation servers described above with reference to FIGS. 1-5 (e.g., visited validation server 156). As used herein, the term "adapted" in relation to the processing circuit 802 may refer to the processing circuit 802 being one or more of configured, employed, implemented, or programmed to perform a particular process, function, step and/or routine according to various features described herein.

Figure 9:
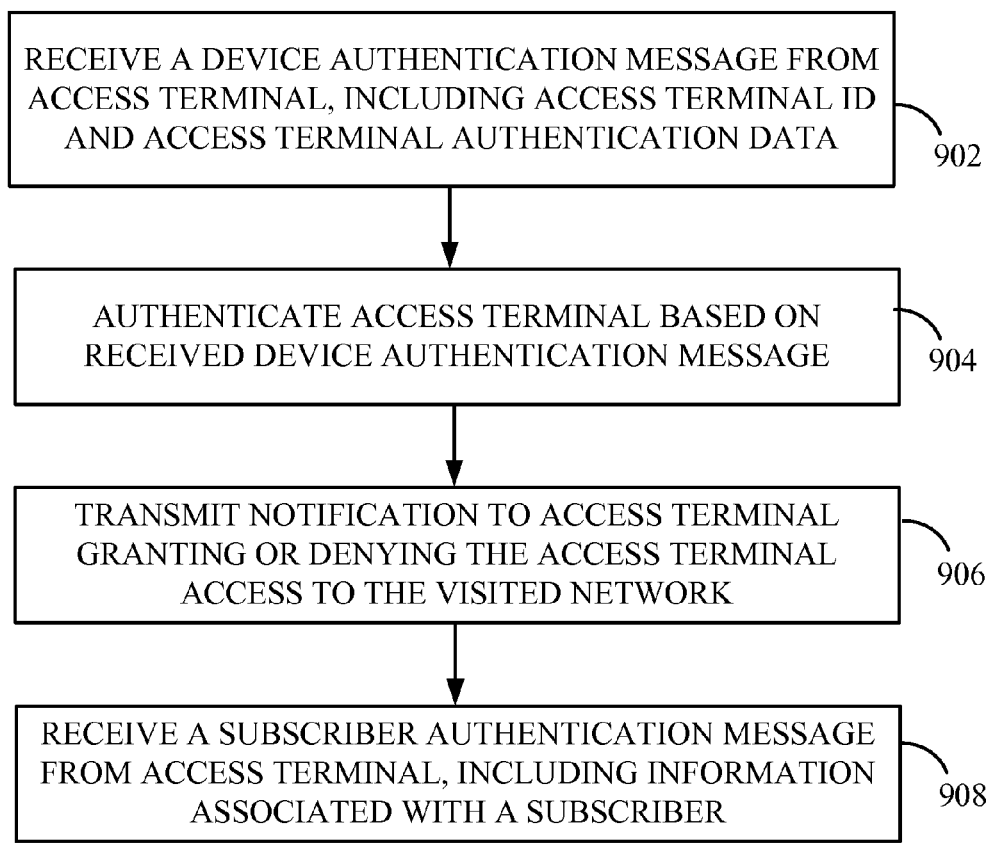
FIG. 9 is a flow diagram illustrating an example of a method operational in a visited validation server for facilitating device authentication of an access terminal roaming within a visited network.

FIG. 9 is a flow diagram illustrating an example of a method operational in a visited validation server, such as the visited validation server 800, for facilitating device authentication of an access terminal when the access terminal is roaming within a visited network. The visited validation server 800 may receive a device authentication message from an access terminal at step 902. The device authentication message can include the access terminal ID, as well as access terminal authentication data, such as a digital signature by the validation key (e.g., private key, shared secret key) associated with the access terminal ID and/or an access terminal authentication token. For example, the processing circuit 802 may receive the device authentication message via the communication interface 806.

At step 904, the visited validation server 800 can authenticate the access terminal based on the device authentication message. For example, in some implementations where the access terminal authentication data includes a digital signature by the validation key, the access terminal authentication module 812 of the processing circuit 802 may forward, via the communication interface 806, the device authentication message to a home validation server located within a home network for verification by the home validation server of the authentication message. The access terminal authentication module 812 can then receive an authentication result via the communication interface 806 from the home validation server indicating whether authentication of the access terminal was successful.

In one or more other implementations where the access terminal authentication data includes a digital signature by the validation key, the access terminal authentication module 812 of the processing circuit 802 may obtain a certificate associated with the access terminal ID. According to various implementations, the certificate associated with the access terminal ID may be obtained, for example, from the visited network (e.g., from the memory circuit 804 of the visited validation server 800), from a third-party certificate authority, from the access terminal (e.g., included in the device authentication message, obtained in a separate transmission), or from any other trusted third party. After retrieving the certificate, the access terminal authentication module 812 can verify the digital signature using the retrieved certificate.

In one or more implementations where the access terminal authentication data includes an access terminal authentication token, the access terminal authentication module 812 of the processing circuit 802 can send a request to a home validation server for a second authentication token associated with the access terminal. In response, the access terminal authentication module 812 can receive the second authentication token from the home validation server, and can compare the access terminal authentication token to the second authentication token. If the access terminal authentication token and the second authentication token match, the access terminal authentication module 812 may authenticate the access terminal and allow network access. On the other hand, if the access terminal authentication token and the second authentication token fail to match, the access terminal authentication module 812 may deny the access terminal network access.

The visited validation server 800 can transmit a notification to the access terminal granting or denying access to the visited network for the access terminal based on the authentication at step 906. For example, the access terminal authentication module 812 of the processing circuit 802 may transmit via the communication interface 806 a notification to the access terminal indicating whether access has been denied or granted based on the authentication.

At step 908, the visited validation server 800 may also receive a subscriber authentication message from the access terminal For instance, subscriber authentication module 814 of the processing circuit 802 may receive via the communication interface 806 a subscriber authentication message including information associated with the subscriber, such as information generated using subscriber data stored in a subscriber identity module (e.g., SIM, USIM, CSIM, RUIM). The subscriber authentication can be carried out according to conventional subscriber authentication procedures, as are known generally in the art and are therefore not detailed herein. According to various implementations, the subscriber authentication process can be carried out prior to, concurrent with or subsequent to the device authentication process of steps 902 through 906. In some implementations, the subscriber authentication message may be a separate message from the device authentication message. In other implementations, the subscriber authentication message and the device authentication message may be integrated into a single message adapted for authenticating both the access terminal and the subscriber.

Exemplary Home Validation Server

Figure 10:
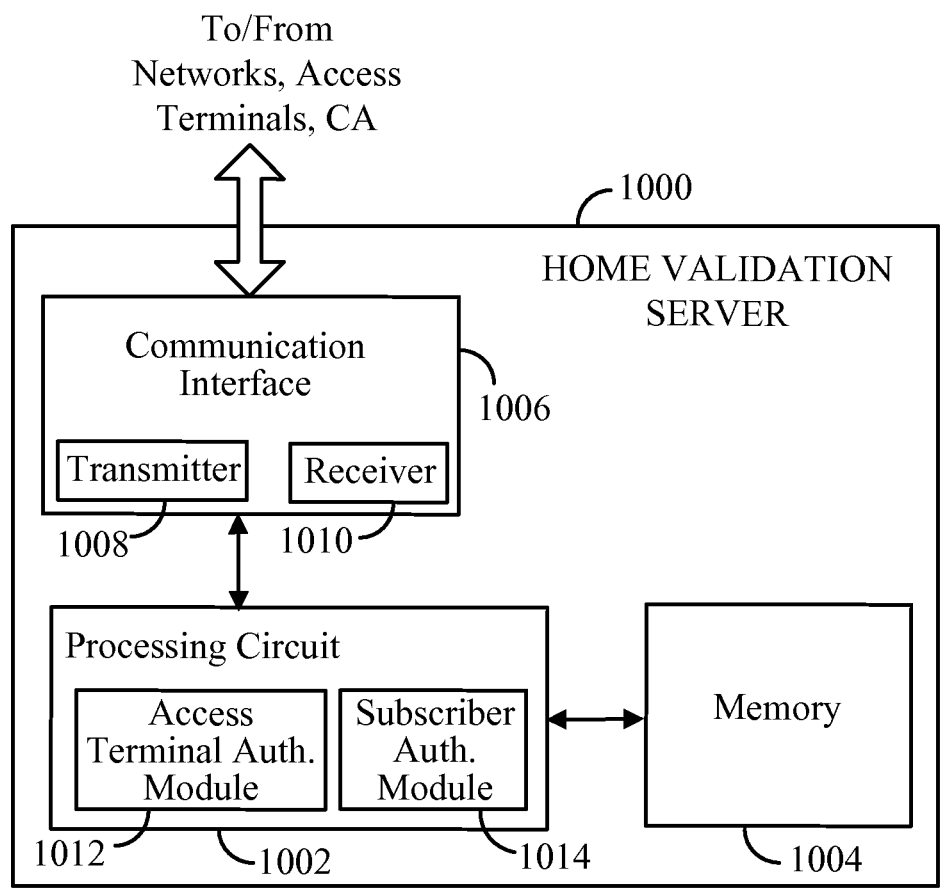
FIG. 10 illustrates a functional block diagram of at least one embodiment of a home validation server.

FIG. 10 illustrates a functional block diagram of at least one embodiment of a home validation server 1000. The home validation server 1000 may generally comprise a processing circuit 1002, a memory circuit 1004, and a communication interface 1006.

The processing circuit 1002 is arranged to obtain, process and/or send data, control data access and storage, issue commands, and control other desired operations. The processing circuit 1002 can be coupled to the memory circuit 1004 such that the processing circuit 1002 can read information from, and write information to, the memory circuit 1004. In the alternative, the memory circuit 1004 may be integral to the processing circuit 1002. According to at least one embodiment, the processing circuit 1002 can include an access terminal authentication module/circuit 1012 adapted to perform one or more of the various operations on the home validation server 1000 for authenticating an access terminal according to one or more of the access terminal authentication procedures described herein. The processing circuit 1002 may also include a subscriber authentication module/circuit 1014 adapted to perform subscriber authentication procedures according to conventional subscriber authentication practices.

The communication interface 1006 may comprise a transmitter 1008 and/or a receiver 1010 to transmit and receive data from access terminals (e.g., access terminal 110 in FIG. 1), certificate authority servers (e.g., CA 180 in FIG. 1), and/or other networks (e.g., visited network 150 in FIG. 1).

According to one or more features, the processing circuit 1002 of the home validation server 1000 may be adapted to perform any or all of the processes, functions, steps and/or routines related to the home validation servers described above with reference to FIGS. 1-5 (e.g., home validation server 122). As used herein, the term "adapted" in relation to the processing circuit 1002 may refer to the processing circuit 1002 being one or more of configured, employed, implemented, or programmed to perform a particular process, function, step and/or routine according to various features described herein.

Figure 11:
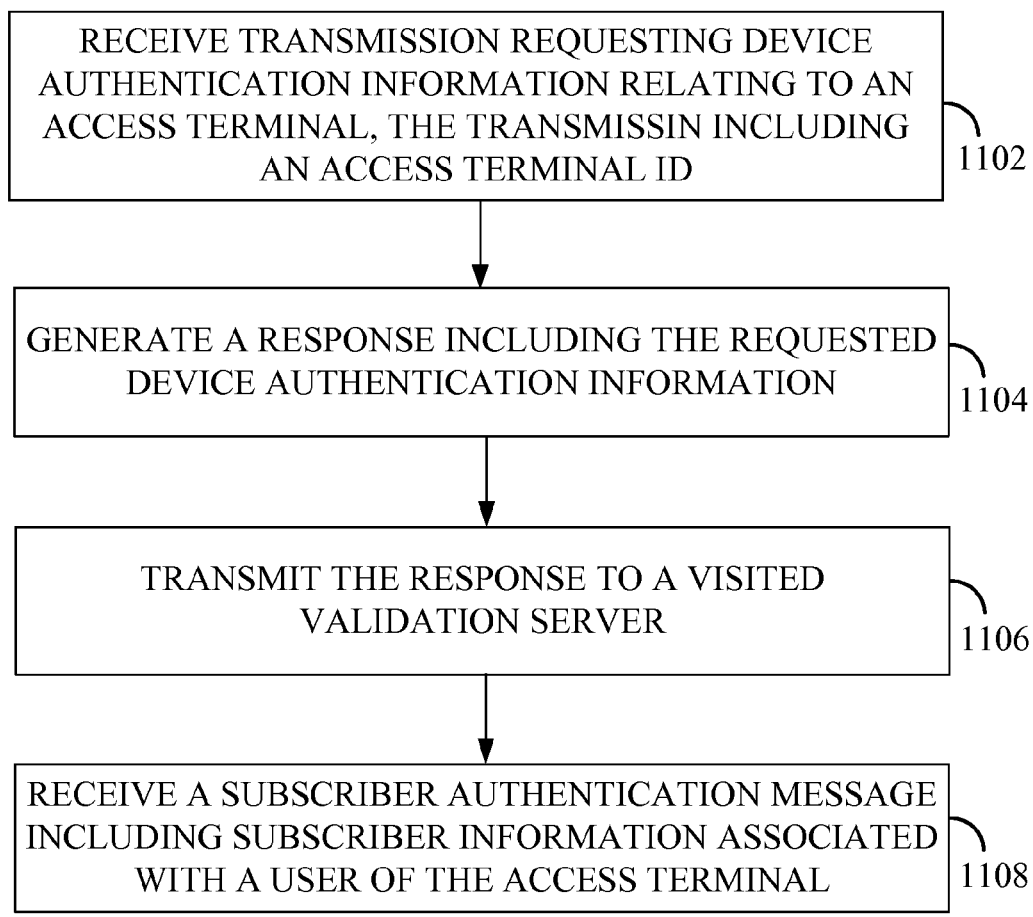
FIG. 11 is a flow diagram illustrating an example of a method operational in a home validation server for facilitating device authentication of an access terminal roaming within a visited network.

FIG. 11 is a flow diagram illustrating an example of a method operational in a home validation server, such as the home validation server 1000, for facilitating device authentication of an access terminal when the access terminal is roaming within a visited network. Referring to FIGS. 10 and 11, a home validation 1000 server may receive a transmission requesting device authentication information relating to an access terminal at step 1102. The received transmission may include an access terminal identifier (ID) associated with the access terminal to enable the home validation server 1000 to obtain and/or generate the proper device authentication information. In at least some implementations, the processing circuit 1002 (e.g., the access terminal authentication module 1012) may receive the transmission via the communication interface 1006.

According to at least some implementations, the transmission may comprise a device authentication message including the access terminal ID and a digital signature by a validation key associated with the access terminal ID. In such implementations, the device authentication message may be received from a visited validation server as a forwarded message, or the device authentication message may be received from the access terminal. In at least some other implementations, the transmission requesting device authentication information relating to the access terminal may comprise a request from the visited validation server for an authentication token associated with the access terminal.

At step 1104, the home validation server generates a response to the received transmission, where the response includes the requested device authentication information. For example, in implementations where the transmission comprises a device authentication message, the access terminal authentication module 1012 of the processing circuit 1002 may validate the digital signature included with the device authentication message, and may generate an authentication result message indicating whether the validation of the digital signature was successful. In other implementations, where the transmission comprises a request for an authentication token associated with the access terminal, the the access terminal authentication module 1012 may generate the requested authentication token using the access terminal ID that was included in the transmission to generate the correct authentication token.

At step 1106, the home validation server transmits the generated response to the visited validation server. For example, in implementations where the home validation server generates the authentication result message, the processing circuit 1002 (e.g., the access terminal authentication module 1012) may transmit the authentication result message via the communication interface 1006 to the visited validation server to indicate whether validation of the digital signature was successful. In those implementations where the home validation server generates the authentication token, the processing circuit 1002 (e.g., the access terminal authentication module 1012) can send the authentication token associated with the specified access terminal ID via the communications interface 1006 to the visited validation server.

According to at least some implementations, the home validation server may also receive a subscriber authentication message including subscriber information associated with a user of the access terminal at step 1108. For instance, the subscriber authentication module 1014 of the processing circuit 1002 may receive via the communication interface 1006 a subscriber authentication message including information associated with a user (or subscriber), such as information generated using subscriber data stored in a subscriber identity module (e.g., SIM, USIM, CSIM, RUIM). The subscriber authentication can be carried out by the subscriber authentication module 1014 according to conventional subscriber authentication procedures, as are known generally in the art and are therefore not detailed herein. According to various implementations, the subscriber authentication process can be carried out prior to, concurrent with or subsequent to the device authentication process of steps 1102 through 1106.

One or more of the components, steps, features and/or functions illustrated in FIGS. 1, 2, 3, 4, 5, 6, 7, 8, 9, 10 and/or 11 may be rearranged and/or combined into a single component, step, feature or function or embodied in several components, steps, or functions. Additional elements, components, steps, and/or functions may also be added without departing from the present disclosure. The apparatus, devices, and/or components illustrated in FIGS. 1, 6, 8 and/or 10 may be configured to perform one or more of the methods, features, or steps described with reference to FIGS. 2, 3, 4, 5, 7, 9 and/or 11. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A processing circuit, as described herein (e.g., processing circuits 602, 802 and/or 1002), may comprise circuitry configured to implement desired programming provided by appropriate media in at least one embodiment. For example, a processing circuit may be implemented as one or more of a processor, a controller, a plurality of processors and/or other structure configured to execute executable instructions including, for example, software and/or firmware instructions, and/or hardware circuitry. Embodiments of a processing circuit may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit are for illustration and other suitable configurations within the scope of the present disclosure are also contemplated.

As described herein above, memory circuit, such as memory circuits 604, 804 and/or 1004, may represent one or more devices for storing programming and/or data, such as processor executable code or instructions (e.g., software, firmware), electronic data, databases, or other digital information. A memory circuit may be any available media that can be accessed by a general purpose or special purpose processor. By way of example and not limitation, memory circuit may include read-only memory (e.g., ROM, EPROM, EEPROM), random access memory (RAM), magnetic disk storage mediums, optical storage mediums, flash memory devices, and/or other non-transitory computer-readable mediums for storing information.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the disclosure described herein can be implemented in different systems without departing from the disclosure. It should be noted that the foregoing embodiments are merely examples and are not to be construed as limiting the disclosure. The description of the embodiments is intended to be illustrative, and not to limit the scope of the disclosure. As such, the present teachings can be readily applied to other types of apparatuses and many alternatives, modifications, and variations will be apparent to those skilled in the art.

What is claimed is:

1. A method operational on an access terminal for facilitating device authentication of the access terminal while roaming within a visited network, comprising:
    obtaining a validation key associated with an access terminal equipment identifier of the access terminal, wherein the access terminal equipment identifier includes an International Mobile Equipment Identity (IMEI) or a Mobile Equipment Identity (MEID);

generating a device authentication message including the access terminal equipment identifier, at least one nonce, and authentication data generated at least in part using the validation key;

obtaining limited access to the visited network fro the purposes of transmitting the device authentication message through the visited network to a home validation server of a home network of the access terminal and then transmitting the device authentication message through the visited network to the home validation server to authenticate the access terminal as an authorized access terminal for accessing the visited network; and receiving a notification granting or denying the access terminal access to the visited network based on validation of the device authentication message.

2. The method of claim 1, wherein obtaining the validation key comprises:
obtaining the validation key as either a private/public key pair or as a shared secret key.

3. The method of claim 1, wherein generating the device authentication message including the access terminal equipment identifier and the authentication data generated at least in part using the validation key comprises:
generating the device authentication message including the access terminal equipment identifier and a digital signature by the validation key.

4. The method of claim 1, wherein generating the device authentication message including the access terminal equipment identifier and the authentication data generated at least in part using the validation key comprises:
generating the device authentication message including the access terminal equipment identifier and a value updated in accordance with a sequence known to a home network of the access terminal.

5. The method of claim 1, wherein limited access to the visited network is obtained from a visited validation server.

6. The method of claim 1, wherein transmitting the device authentication message comprises:
transmitting the device authentication message to the home validation server via the visited network wherein the device authentication message includes a value updated in accordance with a sequence known to a home network of a access terminal.

7. The method of claim 1, wherein generating the device authentication message including the access terminal equipment identifier and the authentication data generated at least in part using the validation key comprises:
generating the device authentication message including the access terminal equipment identifier and an access terminal authentication token.

8. The method of claim 1, further comprising:
receiving a request for the device authentication message from the home validation server prior to either generating the device authentication message or transmitting the device authentication message.

9. The method of claim 1, further comprising:
generating a subscriber authentication message including information associated with the subscriber; and
transmitting the subscriber authentication message for verifying that the subscriber is authorized for network access.

10. An access terminal, comprising:
a wireless communication interface operative to communicate with a visited network; and
a processing circuit coupled to the wireless communication interface and adapted to:

obtain a validation key associated with an access terminal equipment identifier of the access terminal, wherein the access terminal equipment identifier includes an International Mobile Equipment Identity (IMEI) or a Mobile Equipment Identity (MEID);

generate a device authentication message including the access terminal equipment identifier, at least one nonce, and authentication data generated at least in part using the validation key;

obtain limited access to the visited network for the purposes of transmitting the device authentication message through the visited network to a home validation server of a home network of the access terminal and then transmit the device authentication message through the visited network to the home validation server via the wireless communication interface, wherein the device authentication message is adapted to authenticate the access terminal as an authorized access terminal for accessing the visited network; and receive a notification via the wireless communication interface granting or denying the access terminal access to the visited network based on validation of the device authentication message.

11. The access terminal of claim 10, wherein the validation key comprises one of a private/public key pair or a shared secret key.

12. The access terminal of claim 10, wherein the authentication data comprises a digital signature by the validation key.

13. The access terminal of claim 10, wherein the authentication data comprises a value updated in accordance with a sequence known to a home network of the access terminal.

14. The access terminal of claim 10, wherein the limited access to the visited network is obtained from a visited validation server.

15. The access terminal of claim 10, wherein the authentication data comprises an access terminal authentication token, and the processing circuit is adapted to transmit the access terminal equipment identifier and the authentication token to the home validation server.

16. The access terminal of claim 10, wherein the processing circuit is further adapted to:
generate a subscriber authentication message including information associated with the subscriber; and
transmit the subscriber authentication message for verifying that the subscriber is authorized for network access.

17. An access terminal, comprising:
means for obtaining a validation key associated with an access terminal equipment identifier of the access terminal, wherein the access terminal equipment identifier includes an International Mobile Equipment Identity (IMEI) or a Mobile Equipment Identity (MEID);

means for generating a device authentication message including the access terminal equipment identifier, at least one nonce, and authentication data generated at least in part using the validation key;

means for obtaining limited access to the visited network for the purposes of transmitting the device authentication message through the visited network to a home validation server of a home network of the access terminal and then transmitting the device authentication message through the visited network to the home validation server to authenticate the access terminal as an authorized access terminal for accessing a visited network; and means for receiving a notification granting or denying the access terminal access to the visited network based on validation of the device authentication message.

18. The access terminal of claim 17, wherein the authentication data comprises at least one of a digital signature by the validation key or an access terminal authentication token generated at least in part using the validation key, and a value updated in accordance with a sequence known to a home network of the access terminal.

19. The access terminal of claim 17, further comprising:
means for generating a subscriber authentication message including information associated with the subscriber; and
means for transmitting the subscriber authentication message for verifying that the subscriber is authorized for network access.

20. A non-transitory processor-readable storage medium having one or more instructions operational on an access terminal, which when executed by a processor causes the processor to:
obtain a validation key associated with an access terminal equipment identifier of the access terminal, wherein the access terminal equipment identifier includes an International Mobile Equipment Identity (IMEI) or a Mobile Equipment Identity (MEID);
generate a device authentication message including the access terminal equipment identifier, at least one nonce, and authentication data generated at least in part using the validation key;
obtain limited access to the visited network for the purposes of transmitting the device authentication message through the visited network to a home validation server of a home network of the access terminal and then transmit the device authentication message through the visited network to the home validation server adapted to authenticate the access terminal as an authorized access terminal for accessing a visited network; and
receive a notification granting or denying the access terminal access to the visited network based on validation of the device authentication message.

21. The non-transitory processor-readable storage medium of claim 20, wherein the authentication data comprises at least one of a digital signature by the validation key or an access terminal authentication token generated at least in part using the validation key, and a value updated in accordance with a sequence known to a home network of the access terminal.

22. The non-transitory processor-readable storage medium of claim 20, further comprising instructions operational on an access terminal, which when executed by a processor causes the processor to:
generate a subscriber authentication message including information associated with the subscriber; and
transmit the subscriber authentication message for verifying that the subscriber is authorized for network access.

23. A method operational at a visited validation server for facilitating device authentication of an access terminal roaming within a visited network, comprising:
granting limited access for the access terminal to the visited network for the purposes of transmitting a device authentication message through the visited network to a home validation server of a home network of the access terminal;
obtaining a device authentication message from the access terminal and forwarding to the home validation server, the device authentication message including an access terminal equipment identifier, at least one nonce, and access terminal authentication data, wherein the access terminal equipment identifier includes an International Mobile Equipment Identity (IMEI) or a Mobile Equipment Identity (MEID);
authenticating the access terminal based on a response to the device authentication message obtained from the home validation server; and
transmitting a notification to the access terminal granting or denying the access terminal access to the visited network.

24. The method of claim 23, wherein obtaining the device authentication message including the access terminal equipment identifier and the access terminal authentication data comprises:
obtaining the device authentication message including the access terminal equipment identifier and a digital signature by a validation key associated with the access terminal equipment identifier of the access terminal.

25. The method of claim 24, wherein authenticating the access terminal based on the device authentication message obtained comprises:
obtaining an authentication result from the home validation server indicating whether authentication of the access terminal was successful.

26. The method of claim 24, wherein authenticating the access terminal based on the device authentication message obtained comprises:
obtaining a certificate associated with the access terminal equipment identifier; and
verifying the digital signature included with the device authentication message using the retrieved certificate.

27. The method of claim 23, wherein the access terminal authentication data includes an access terminal authentication token, and authenticating the access terminal based on the device authentication message comprises:
transmitting a request to a home validation server for a second authentication token associated with the access terminal, the request including a value updated in accordance with the sequence known to the home network of the access terminal;
obtaining the second authentication token from the home validation server;
comparing the access terminal authentication token to the second authentication token;
authenticating the access terminal and allowing network access within the visited network if the access terminal authentication token and the second authentication token match; and
denying the access terminal network access if the access terminal authentication token and the second authentication token fail to match.

28. The method of claim 23, further comprising:
transmitting a request to the access terminal to transmit the authentication message, wherein the request is sent prior to obtaining the authentication message from the access terminal.

29. The method of claim 28, wherein the request is transmitted upon failure to obtain the authentication message from the access terminal after a period of time following initiation of a subscriber authentication from the access terminal.

30. The method of claim 23, further comprising:
obtaining a subscriber authentication message from the access terminal, the subscriber authentication message including information associated with a subscriber.

31. A visited validation server, comprising:
a communication interface adapted to facilitate communication with an access terminal;

a processing circuit coupled to the communication interface, the processing circuit adapted to:
grant limited access for the access terminal to a visited network for the purposes of transmitting a device authentication message through the visited network to a home validation server of a home network of the access terminal;
obtain a device authentication message from the access terminal via the communication interface and forwarding the device authentication message to the home validation server, the device authentication message including an access terminal equipment identifier, at least one nonce, and access terminal authentication data, wherein the access terminal equipment identifier includes an International Mobile Equipment Identity (IMEI) or a Mobile Equipment Identity (MEID);
authenticate the access terminal based on a response to the device authentication message obtained from the home validation server; and
transmit a notification to the access terminal via the communication interface granting or denying the access terminal access to a visited network.

32. The visited validation server of claim 31, wherein the access terminal authentication data includes a digital signature by a validation key associated with the access terminal equipment identifier of the access terminal.

33. The visited validation server of claim 32, wherein the processing circuit being adapted to authenticate the access terminal, comprises the processing circuit being adapted to:
receive an authentication result from the home validation server indicating whether authentication of the access terminal was successful.

34. The visited validation server of claim 32, wherein the processing circuit being adapted to authenticate the access terminal comprises the processing circuit being adapted to:
obtain a certificate associated with the access terminal equipment identifier; and
verify the digital signature included with the device authentication message using the retrieved certificate.

35. The visited validation server of claim 31, wherein the access terminal authentication data includes an access terminal authentication token, and the processing circuit being adapted to authenticate the access terminal comprises the processing circuit being adapted to:
transmit a request to a home validation server for a second authentication token associated with the access terminal, the request including a value updated in accordance with the sequence known to the home network of the access terminal;
obtain the second authentication token from the home validation server;
compare the access terminal authentication token to the second authentication token;
authenticate the access terminal and allowing network access within the visited network if the access terminal authentication token and the second authentication token match; and
deny the access terminal network access if the access terminal authentication token and the second authentication token fail to match.

36. The visited validation server of claim 31, wherein the processing circuit is further adapted to:
obtain a subscriber authentication message from the access terminal, the subscriber authentication message including information associated with a subscriber.

37. A visited validation server, comprising:
means for granting limited access for the access terminal to a visited network for the purposes of transmitting a device authentication message through the visited network to a home validation server of a home network of the access terminal;
means for obtaining a device authentication message from an access terminal and forwarding the device authentication message to the home validation server, the device authentication message including an access terminal equipment identifier, at least one nonce, and access terminal authentication data, wherein the access terminal equipment identifier includes an International Mobile Equipment Identity (IMEI) or a Mobile Equipment Identity (MEID);
means for authenticating the access terminal based on a response to the device authentication message obtained from the home validation server; and
means for transmitting a notification to the access terminal granting or denying the access terminal access to a visited network.

38. The visited validation server of claim 37, wherein the access terminal authentication data includes at least one of a digital signature by a validation key associated with the access terminal equipment identifier or an access terminal authentication token, and a value updated in accordance with the sequence known to the home network of the access terminal.

39. The visited validation server of claim 37, further comprising:
means for obtaining a subscriber authentication message from the access terminal, the subscriber authentication message including information associated with a subscriber.

40. A non-transitory processor-readable medium having one or more instructions operational on a visited validation server, which when executed by a processor causes the processor to:
grant limited access for an access terminal to a visited network for the purposes of transmitting a device authentication message through the visited network to a home validation server of a home network of the access terminal;
obtain a device authentication message from the access terminal and forward the device authentication message to the home validation server, the device authentication message including an access terminal equipment identifier, at least one nonce, and access terminal authentication data, wherein the access terminal equipment identifier includes an International Mobile Equipment Identity (IMEI) or a Mobile Equipment Identity (MEID);
authenticate the access terminal based on a response to the device authentication message obtained from the home validation server; and
transmit a notification to the access terminal granting or denying the access terminal access to a visited network.

41. The non-transitory processor-readable medium of claim 40, wherein the access terminal authentication data includes at least one of a digital signature by a validation key associated with the access terminal equipment identifier, or an access terminal authentication token, and a value updated in accordance with the sequence known to the home network of the access terminal.

42. The non-transitory processor-readable medium of claim 41, wherein the one or more instructions adapted to cause a processor to authenticate the access terminal include one or more instructions, which when executed by a processor causes the processor to:

obtain an authentication result from the home validation server indicating whether authentication of the access terminal was successful.

43. The non-transitory processor-readable medium of claim 41, wherein the one or more instructions adapted to cause a processor to authenticate the access terminal include one or more instructions, which when executed by a processor causes the processor to:

obtain a certificate associated with the access terminal equipment identifier; and verify the digital signature included with the device authentication message using the retrieved certificate.

44. The non-transitory processor-readable storage medium of claim 41, wherein the one or more instructions adapted to cause a processor to authenticate the access terminal include one or more instructions, which when executed by a processor causes the processor to:

transmit a request to a home validation server for a second authentication token associated with the access terminal, the request including a value updated in accordance with the sequence known to the home network of the access terminal;

obtain the second authentication token from the home validation server;

compare the access terminal authentication token to the second authentication token;

authenticate the access terminal and allowing network access within the visited network if the access terminal authentication token and the second authentication token match; and deny the access terminal network access if the access terminal authentication token and the second authentication token fail to match.

45. The non-transitory processor-readable storage medium of claim 40, further comprising one or more instructions, which when executed by a processor causes the processor to:

obtain a subscriber authentication message from the access terminal, the subscriber authentication message including information associated with a subscriber.

46. A method operational at a home validation server for facilitating device authentication of an access terminal roaming within a visited network, comprising:

obtaining a transmission via a visited network that has granted limited access to the access terminal for the purposes of transmitting a device authentication message through the visited network to the home validation server, the transmission requesting device authentication information relating to the access terminal, the transmission including an access terminal equipment identifier associated with the access terminal, wherein the access terminal equipment identifier includes an International Mobile Equipment Identity (IMEI) or a Mobile Equipment Identity (MEI);

generating a response including the requested device authentication information, and at least one nonce; and locating a visiting validation server that granted the limited access and transmitting the response to the visited validation server that granted the limited access.

47. The method of claim 46, wherein obtaining the transmission requesting device authentication information relating to an access terminal comprises:

obtaining a device authentication message including the access terminal equipment identifier and a digital signature by a validation key associated with the access terminal equipment identifier of the access terminal.

48. The method of claim 47, wherein obtaining the device authentication message comprises:

obtaining the device authentication message forwarded from the visited validation server wherein the device authentication message includes a value updated in accordance with a sequence known to the home validation server.

49. The method of claim 47, wherein obtaining the device authentication message comprises:

obtaining the device authentication message from the access terminal via the visited validation server.

50. The method of claim 47, wherein generating the response including the requested device authentication information comprises:

validating the digital signature included with the device authentication message; and generating an authentication result message indicating whether validation of the digital signature was successful.

51. The method of claim 46, wherein obtaining the transmission requesting device authentication information relating to an access terminal comprises:

obtaining a request from the visited validation server for an authentication token associated with the access terminal.

52. The method of claim 51, wherein generating the response including the requested device authentication information comprises:

generating the authentication token using the access terminal equipment identifier included in the transmission.

53. The method of claim 46, further comprising:

obtaining a subscriber authentication message including subscriber information associated with a user of the access terminal.

54. A home validation server, comprising:

a communication interface; and a processing circuit coupled with the communication interface, the processing circuit adapted to:

obtain a transmission via a visited network that has granted limited access to the access terminal for the purposes of transmitting a device authentication message through the visited network to the home validation server, the transmission requesting device authentication information relating to the access terminal, the transmission including an access terminal equipment identifier associated with the access terminal, wherein the access terminal equipment identifier includes an International Mobile Equipment Identity (IMEI) or a Mobile Equipment Identity (MEID);

generate a response including the requested device authentication information, and at least one nonce; and locate a visiting validation server that granted the limited access and transmit the response to the visited validation server that granted the limited access.

55. The home validation server of claim 54, wherein the transmission requesting device authentication information comprises a device authentication message including the access terminal equipment identifier, a digital signature by a validation key associated with the access terminal equipment identifier of the access terminal and a value updated in accordance with a sequence known to the home validation server.

56. The home validation server of claim 55, wherein the processing circuit being adapted to generate the response including the requested device authentication information comprises the processing circuit being adapted to:
  validate the digital signature included with the device authentication message; and
  generate an authentication result message indicating whether validation of the digital signature was successful.

57. The home validation server of claim 54, wherein the transmission requesting device authentication information comprises a request from the visited validation server for an authentication token associated with the access terminal.

58. The home validation server of claim 57, wherein the processing circuit being adapted to generate the response including the requested device authentication information comprises the processing circuit being adapted to:
  generate the authentication token using the access terminal equipment identifier included in the transmission.

59. The home validation server of claim 54, wherein the processing circuit is further adapted to:
  obtain a subscriber authentication message including subscriber information associated with a user of the access terminal.

60. A home validation server, comprising:
  means for obtaining a transmission via a visited network that has granted limited access to the access terminal for the purposes of transmitting a device authentication message through the visited network to the home validation server, the transmission requesting device authentication information relating to the access terminal, the transmission including an access terminal equipment identifier associated with the access terminal, wherein the access terminal equipment identifier includes an International Mobile Equipment Identity (IMEI) or a Mobile Equipment Identity (MEID);
  means for generating a response including the requested device authentication information, and at least one nonce; and
  means for locating a visiting validation server that granted the limited access and for transmitting the response to the visited validation server that granted the limited access.

61. A non-transitory processor-readable storage medium having one or more instructions operational on a home validation server, which when executed by a processor causes the processor to:
  obtain a transmission via a visited network that has granted limited access to the access terminal for the purposes of transmitting a device authentication message through the visited network to the home validation server, the transmission requesting device authentication information relating to the access terminal, the transmission including an access terminal equipment identifier associated with the access terminal, wherein the access terminal equipment identifier includes an International Mobile Equipment Identity (IMEI) or a Mobile Equipment Identity (MEID);
  generate a response including the requested device authentication information, and at least one nonce; and
  locate a visiting validation server that granted the limited access and transmit the response to the visited validation server that granted the limited access.

* * * * *